US012452705B1

(12) United States Patent
Rofougaran et al.

(10) Patent No.: US 12,452,705 B1
(45) Date of Patent: *Oct. 21, 2025

(54) REPEATER DEVICE, WIRELESS COMMUNICATION SYSTEM, AND METHOD FOR ULTRA-LOW LATENCY DATA FRAME ROUTING USING LABELLING

(71) Applicant: PELTBEAM INC., Sherman Oaks, CA (US)

(72) Inventors: Ahmadreza Rofougaran, Newport Beach, CA (US); Mehdi Hatamian, Mission Viejo, CA (US); Shervin Alireza Odabaee, Newport Coast, CA (US); Dan Nguyen, Huntington Beach, CA (US); Arman Rofougaran, Newport Coast, CA (US); Milan Rofougaran, Newport Coast, CA (US); Puya Rofougaran, Irvine, CA (US); Kavian Odabaee, Newport Coast, CA (US)

(73) Assignee: PELTBEAM INC., Sherman Oaks, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 19/047,674

(22) Filed: Feb. 7, 2025

Related U.S. Application Data

(63) Continuation of application No. 18/884,198, filed on Sep. 13, 2024, now Pat. No. 12,256,243.

(51) Int. Cl.
*H04W 24/02* (2009.01)
*H04W 16/28* (2009.01)
*H04W 64/00* (2009.01)

(52) U.S. Cl.
CPC .......... *H04W 24/02* (2013.01); *H04W 16/28* (2013.01); *H04W 64/003* (2013.01)

(58) Field of Classification Search
CPC ... H04W 24/02; H04W 16/28; H04W 64/003; H04W 84/047; H04W 4/029; H04W 88/00; H04W 88/02; H04W 88/08; H04W 76/00; H04W 76/10; H04W 76/11; H04W 72/1268; H04W 72/1273; H04W 40/00;
(Continued)

(56) References Cited

U.S. PATENT DOCUMENTS 5,648,784 A * 7/1997 Benedicto Ruiz et al. .. 342/373
10,389,588 B2 * 8/2019 Zheng ................... H04L 41/085
(Continued)

*Primary Examiner* — Jean A Gelin
(74) *Attorney, Agent, or Firm* — CHIP LAW GROUP

(57) ABSTRACT

A repeater device as switch node in a wireless communication system, includes a donor antenna that obtains a first beam of RF signals from an upstream neighboring node. The repeater device further includes a switch circuit that detects a label in a preamble of each data frame of a plurality of data frames carried by first beam of RF signals independent of decoding other header information and user data in each data frame and determines routing decisions for the plurality of data frames based on the detected label in each data frame. The plurality of data frames is then switched, via a RF switching fabric, based on the detected label in each data frame such that each data frame is routed to a corresponding service phased antenna array of the plurality of service phased antenna arrays for communication via a plurality of service phased antennas.

20 Claims, 11 Drawing Sheets

(58) Field of Classification Search
CPC ...... H04W 40/22; H04W 40/005; H04B 3/58;
H04B 5/43; H04B 10/29; H04B 10/298;
H04B 10/40; H04B 1/0483; H04B
1/7113; H04B 1/7115; H04B 1/7117;
H04B 7/0817; H04B 7/082; H04B
7/0897; H04B 7/14; H04B 7/15557;
H04B 7/15592
USPC ........................................................ 370/329
See application file for complete search history.

(56) References Cited

U.S. PATENT DOCUMENTS

| | | | |
|---|---|---|---|
| 2007/0286090 A1* | 12/2007 | Rusmisel et al. | 370/252 |
| 2008/0279110 A1* | 11/2008 | Hart et al. | 370/248 |
| 2013/0044028 A1* | 2/2013 | Lea et al. | 342/359 |
| 2016/0219024 A1* | 7/2016 | Verzun et al. | H04L 63/0464 |
| 2017/0012694 A1* | 1/2017 | Kaku | H04B 7/14 |
| 2017/0318589 A1* | 11/2017 | Negus | H04W 72/0453 |
| 2022/0070868 A1* | 3/2022 | Ishiguro et al. | H04W 72/0453 |
| 2023/0199652 A1* | 6/2023 | Mehrnoush et al. | H04W 52/0229 |

* cited by examiner

REPEATER DEVICE, WIRELESS COMMUNICATION SYSTEM, AND METHOD FOR ULTRA-LOW LATENCY DATA FRAME ROUTING USING LABELLING

CROSS-REFERENCE TO RELATED APPLICATIONS/INCORPORATION BY REFERENCE

This Patent Application makes reference to, claims priority to, claims the benefit of, and is a Continuation Application of U.S. patent application Ser. No. 18/884,198 filed on Sep. 13, 2024. The above-referenced application is hereby incorporated herein by reference in its entirety.

FIELD OF TECHNOLOGY

Certain embodiments of the disclosure relate to a repeater device and wireless communication system for fixed wireless access (FWA). More specifically, certain embodiments of the disclosure relate to a repeater device configured as a switch node in a wireless communication system, the wireless communication system, and a method for high-performance, ultra-low latency data frames routing in a wireless backhaul network of the wireless communication system.

BACKGROUND

Conventional communication devices, such as wireless access points (WAPs), are often used to extend the wireless coverage of an existing Wi-Fi signal to access the Internet and to increase the number of end-user devices capable of using Wi-Fi® may connect to the WAPs. However, Wi-Fi® signals, under the limitation of the Wi-Fi® communication protocol, have a defined range beyond which the connectivity is lost. Thus, many WAPs or range extenders are used if wireless coverage for Wi-Fi® signals is to be extended. Moreover, under ideal conditions, typically, 2.4 GHz Wi-Fi® supports up to 450 Mbps or 600 Mbps, and 5 GHz Wi-Fi® supports up to 1300 Mbps. Thus, the data transmission over such narrow bandwidth is much lower than higher radio frequencies.

The emergence of fifth generation (5G) technology standards for cellular networks has unleashed unprecedented possibilities across industries fueled by multi-gigabit speeds, massive capacity, and low latency. However, prohibitive infrastructure costs have challenged full-scale realization. Legacy wireless systems also face inconsistencies around throughput, resilience, and complexity. This necessitates carrier-grade wireless connectivity to deliver fiber-like consistency combined with agile, scalable deployment models. Furthermore, latency and signal noise are other technical problems with existing wireless communication systems and network architecture. Such latency increases when more wireless access points or relay nodes are introduced to extend the communication range.

Further limitations and disadvantages of conventional and traditional approaches will become apparent to one of skill in the art through comparison of such systems with some aspects of the present disclosure as set forth in the remainder of the present application with reference to the drawings.

BRIEF SUMMARY OF THE DISCLOSURE

A repeater device configured as a switch node in a wireless communication system, the wireless communication system, and a method for high-performance, ultra-low latency data frames routing in a wireless backhaul network of the wireless communication system, substantially as shown in and/or described in connection with at least one of the figures, as set forth more completely in the claims.

These and other advantages, aspects and novel features of the present disclosure, as well as details of an illustrated embodiment thereof, will be more fully understood from the following description and drawings.

DETAILED DESCRIPTION OF THE DISCLOSURE

Certain embodiments of the disclosure may be found in a repeater device configured as a switch node in a wireless communication system, the wireless communication system, and a method for high-performance, ultra-low latency routing of data frames in a wireless backhaul network of the wireless communication system. The wireless communication system intelligently balances the simplicity and low latency of analog signal relaying with the flexibility and intelligence of label-based switching for ultra-low latency in data frames routing without decoding of user data and any other header portion other than the inserted label in each data frame in the network. This approach allows to achieve not only the low latency and high efficiency of analog signal relaying but also the flexibility and programmability of data frames routing across the wireless backhaul network without any overhead or processing complexity. The wireless communication system and method of the present disclosure not only improves data transfer rates between at least two communication devices as compared to existing wireless systems (e.g. conventional wireless local area networks (WLANs), Wi-Fi® systems, or traditional Wi-Fi® mesh networks), but also enables almost near zero latency communication and an always-connected experience.

In the following description, reference is made to the accompanying drawings, which form a part hereof, and in which is shown, by way of illustration, various embodiments of the present disclosure.

Figure 1A:
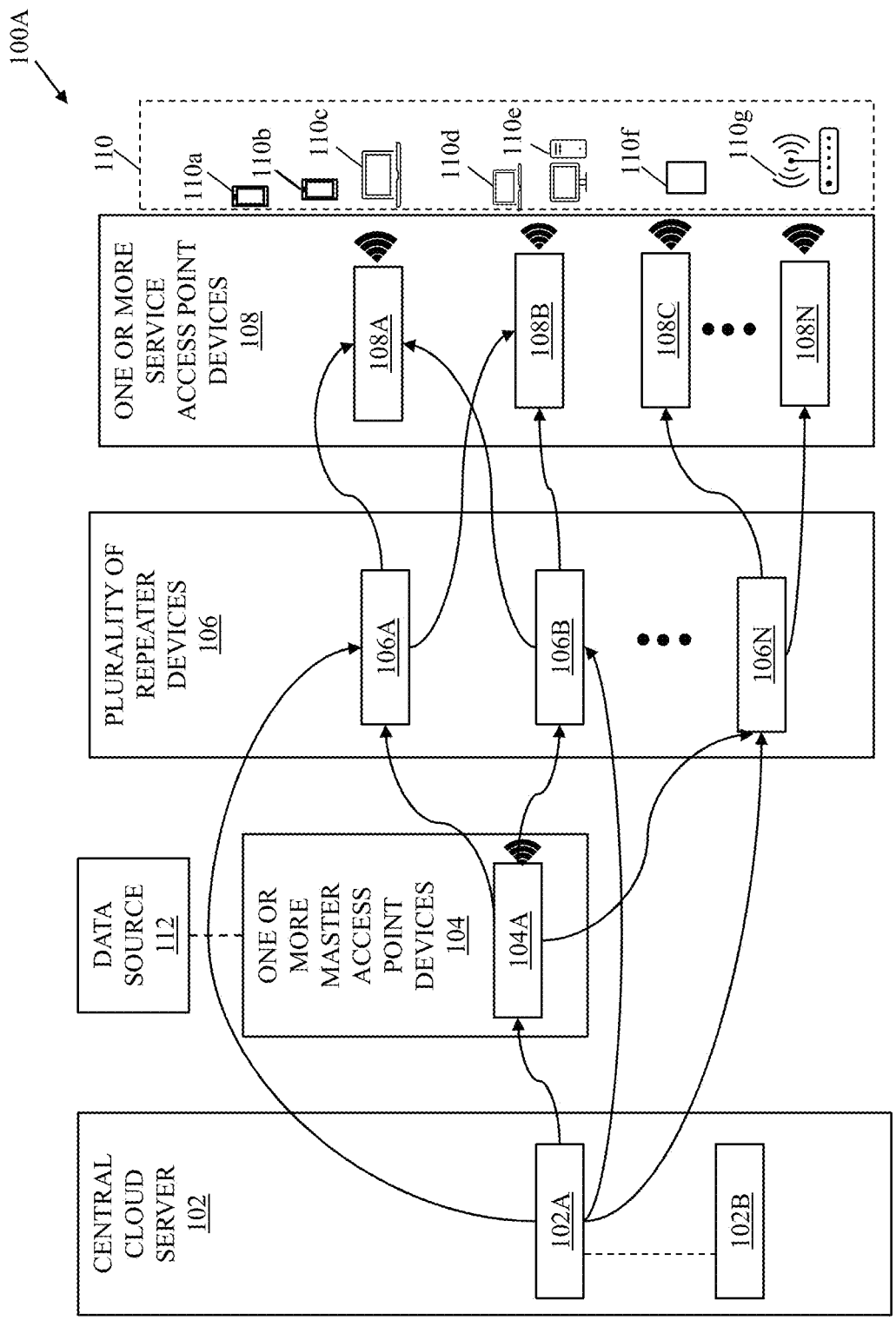
FIG. 1A is a diagram that illustrates an exemplary wireless communication system, in accordance with an exemplary embodiment of the disclosure.

FIG. 1A is a diagram that illustrates an exemplary wireless communication system, in accordance with an exemplary embodiment of the disclosure. With reference to FIG. 1A, there is shown a wireless communication system 100A. The wireless communication system 100A may include a central cloud server 102, one or more master Wireless Access Point (WAP) devices 104, a plurality of repeater devices 106, and one or more service WAP devices 108. There is further shown one or more user equipment (UEs) 110 (e.g., UEs 110a to 110g) and a data source 112. The central cloud server 102 may include one or more processors, such as the processor 102A, and a neural network model 102B.

The central cloud server 102 includes suitable logic, circuitry, and interfaces that may be configured to communicate with the one or more master WAP devices 104 and the plurality of repeater devices 106. In an implementation, the central cloud server 102 may be communicatively coupled to each network node (e.g., communicatively coupled to the one or more service WAP devices 108 and the one or more UEs 110). In an example, the central cloud server 102 may be a remote management server that is managed by a third party different from the service providers associated with the plurality of different wireless carrier networks (WCNs). In another example, the central cloud server 102 may be a remote management server or a data center that is managed by a third party, or jointly managed, or managed in coordination and association with one or more of the plurality of different WCNs. In an implementation, the central cloud server 102 may be a master cloud server or a master machine that is a part of a data center that controls an array of other cloud servers communicatively coupled to it for load balancing, running customized applications, and efficient data management.

The processor 102A may be further configured to cause each network node of the wireless communication system 100A to determine location information of a plurality of neighboring nodes around each network node. Each network node may determine its geo-location and the geo-location of the neighboring nodes. In an implementation, each of the plurality of repeater devices 106 may further comprise a position sensor (e.g., a gyroscope) or a location sensor (e.g., a global positioning system (GPS) sensor or other geospatial location sensor). In another implementation, each network node may further include Wi-Fi capability, which may be used, for example, to determine its location coordinates or location coordinates of neighboring nodes (e.g., nearby mesh nodes) by received signal strength indication (RSSI)-based triangulation or WI-FI®-based triangulation process, known in the art. Examples of the processor 102A of the central cloud server 102 may include but are not limited to a central processing unit (CPU), graphical processing unit (GPU), a Reduced Instruction Set Computing (RISC) processor, an Application-Specific Integrated Circuit (ASIC) processor, a Complex Instruction Set Computing (CISC) processor, and/or other processors, or state machines.

The neural network model 102B of the central cloud server 102 may be periodically (e.g., daily and for different times-of-day) trained on data points (e.g., telemetry information) uploaded to the central cloud server 102 by each network node, such as the one or more master WAP devices 104, the plurality of repeater devices 106, and the one or more service WAP devices 108.

The one or more master WAP devices 104 includes suitable logic, circuitry, and interfaces that may be configured to provide access to the Internet or wireless backhaul in 5G or 6G networks. Examples of the one or more master WAP devices 104 may include, but is not limited to a home gateway device, a 5G wireless access point, a wireless router, a fifth generation (5G) modem, a backplane system, an evolved-universal terrestrial radio access-new radio (NR) dual connectivity (EN-DC) device, an advanced router, a bridge router, a network controller, a fixed wireless access (FWA) device, a firewall device, or a network security device, or one or more combinations thereof.

Each of the plurality of repeater devices 106 may be a hybrid analog-digital repeater device. Some repeater devices may be configured as a switch node (described in detail, for example, in FIG. 1B) and some may be configured as a root node (described in detail, for example, in FIG. 1B and FIG. 5). The plurality of repeater devices 106 may be disposed as a radio frequency (RF) bridge between the master WAP device 104A and the one or more service WAP devices 108 such that a data propagation path of user data relayed through a network of the plurality of repeater devices 106 may be analog without any digital decoding or encoding of the user data in a RF signal to reduce latency less than a threshold time. For example, the data propagation path may comprise high-frequency analog circuitry to minimize latency to nanoseconds. Multi-hop relaying of intermediate frequency signals (e.g. mmWave signals) may happen without any digital encoding or decoding of the user data (i.e., payload). Further, a backchannel connectivity and control of the network of the plurality of repeater devices 106 may be via a lower WLAN frequency (e.g., 2.4 GHz or 5 Ghz of Wi-Fi® 7 or 8), based on a signal metadata of the incoming RF signal. While the data propagation path may remain entirely analog for lowest latency, the plurality of repeater devices 106 may extract the signal metadata from RF signals for analysis. This allows deriving wireless metrics like timing parameters, signal quality, interference levels, channel state information, and reference signals using digital signal processing (DSP) techniques. Thus, the simplicity and low latency of analog signal relaying is intelligently combined with the flexibility and intelligence of digital processing in a hybrid architecture. The plurality of repeater devices 106 extends the coverage area of the master WAP device 104A and one or more service WAP devices 108, allowing them to serve its corresponding UEs in areas that may have poor signal reception.

The one or more service WAP devices 108 may be configured to receive a beam of RF signals in the intermediate frequency band (e.g., mmWave frequency or intermediate frequency in range of 10-300 GHz) from the one or more second hybrid analog-digital repeater devices (e.g., the repeater devices 106B to 106N) and convert back to the WLAN signal to serve one or more UEs 110 in a data throughput greater than a threshold throughput. Each of the master WAP device 104A and the one or more service WAP devices 108 may be configured to perform Multi-User, Multiple Input, Multiple Output (Mu-MIMO) to corresponding connected UEs via corresponding mmWave New Radio Unlicensed (NR-U) links. The use of intermediate frequencies (e.g., millimeter-wave frequencies) and Mu-MIMO together may provide high data rates and efficient use of the available spectrum. The one or more service WAP devices 108 may also be referred to as an access node or an access repeater device having integrated access point functionalities.

Each of one or more UEs 110 may correspond to a wireless device, such as a client device or a telecommunication hardware used by an end-user to communicate. Some of the one or more UEs 110 may refer to a combination of a mobile equipment and subscriber identity module (SIM). Examples of the one or more UEs 110 may include, but are not limited to a smartphone, a laptop, a desktop machine, a customer premise equipment, a virtual reality headset, an augmented reality device, a wireless modem, a home router, a Wi-Fi® enabled smart television (TV) or set-top box, a VoIP station, or any other customized hardware for wireless communication.

In an implementation, the data source 112 of the master WAP device 104A may be one or more of an optical fiber port connected to an optical fiber for an Internet connection, an Ethernet port connected to an Ethernet cable for the Internet connection, or a 5G or 6G mmWave cellular signal received from a radio access network (RAN) node.

Currently, in WLAN technology, the 2.4 GHz and 5 GHz frequency bands are unlicensed spectrums that limited and congested and when running high-bandwidth applications, existing Wi-Fi networks inevitably encounter low quality of service (QOS). More advanced WLAN technology, like the IEEE 802.11be (Wi-Fi® 7) is being developed with higher data rate capability, such as theoretical capacity of up to 30 Gbps (e.g., assuming ideal conditions like clear line-of-sight, single user, and no interference) while 5-10 Gbps is a more realistic expectation in practical scenarios. There are many factors affecting practical capacity, such as signal interference from nearby devices, appliances, and even weather can disrupt signals, reducing throughput. In another example, distance from access point is also another factor where signal strength weakens with distance, impacting achievable speeds. In yet another example, sharing bandwidth among multiple users reduces individual speeds. One of the main objectives of Wi-Fi® 7 is to make full use of up to 1.2 GHz spectrum resources in the 6 GHz band. However, it is increasingly becoming evident that to effectively utilize these frequency resources, Wi-Fi® 7 or more advanced WLAN technologies may have to coexist with other different technologies operating in the same band, such as IEEE 802.11ax (or IEEE 802.11be) and 5G on the unlicensed band. Coexistence among wireless networks is challenging, especially when these networks are heterogeneous. Densely deployed sub-6 or 6-7.125 GHz WLANs alone may not provide the seamless connectivity required by mobile services and the rapid increase in mobile data traffic in future wireless networks. As a result, one of the main advancements in the network design for WLAN relies on integrating multiple different bands (e.g., microwave and mmWave). Wireless mesh networks (WMNs) are anticipated to resolve the limitations and to significantly improve the performance of ad hoc networks, wireless local area networks (WLANs), wireless personal area networks (WPANs), and wireless metropolitan area networks (WMANs). However, legacy wireless systems face inconsistencies around throughput, resilience, and complexity, where latency and signal noise are other technical problems with existing wireless communication systems and network architecture. Such latency increases when more wireless access points or relay nodes are introduced in the network to extend the communication range. Further, collision avoidance in wireless networks is a significant problem, especially with traditional wireless mesh networks and WLAN systems. Typically, collisions occur when multiple devices attempt to transmit data simultaneously on a shared wireless channel, resulting in corrupted data and reduced network performance.

In contrast to the conventional systems, in the present disclosure, the wireless communication system 100A intelligently balances the simplicity and low latency of analog signal relaying with the flexibility and intelligence of digital processing in a hybrid architecture. This hybrid approach allows to achieve not only the low latency and high efficiency of analog signal relaying but also the flexibility and programmability of digital signal processing. The wireless communication system 100A of the present disclosure not only improves data transfer rates between at least two communication devices as compared to existing wireless systems (e.g. conventional wireless local area networks (WLANs), Wi-Fi® systems, or traditional Wi-Fi® mesh networks) but also enables almost near zero latency communication with significantly reduced interference, almost zero-collision and an always-connected experience.

The routing data frames in a wireless backhaul network using labelling is described in detail, for example, in FIGS. 1B, 1C, 1D, 2, 3, 4, 5, 6, and 7A and 7B. FIG. 1A describes for example, the formation of the wireless backhaul network and different operations of a plurality of different network nodes in the wireless communication system 100A.

In operation, in an aspect of the present disclosure, the master WAP device 104A may be configured to communicate a wireless local area network (WLAN) signal in a first WLAN frequency from the data source 112. In an implementation, the first WLAN frequency may be in a range of 6-9 GHz. In such implementation, the master WAP device 104A may comprise a WLAN adapter or a wireless transceiver that supports Wi-Fi® 7 or 8 and may be backward compatible with previous Wi-Fi® frequencies. It is known that Wi-Fi® 7 supports three bands-2.4 GHz, 5 GHz, and 6 GHz. In another implementation, the first WLAN frequency may be in a C-band spectrum. In yet another implementation, the first WLAN frequency may be a licensed mmWave spectrum of a network operator. In an implementation, the master WAP device 104A may be connected to an optical fibre for the Internet connection or an Ethernet cable for the Internet connection. In such a case, the master WAP device 104A may include an optical fiber port and/or an Ethernet port, or a WLAN Fast Ethernet (FE) port.

The plurality of repeater devices 106 may be disposed at a plurality of different locations. A first repeater device (e.g., the repeater device 106A) may be configured to receive the WLAN signal from the master WAP device 104A. The first repeater device (e.g., the repeater device 106A) may be configured to convert the WLAN signal to a first beam of radio frequency (RF) signal in an intermediate frequency band and may further relay the first beam of RF signals in the intermediate frequency band to one or more second repeater devices (e.g., the repeater devices 106B and 106N) of the plurality of repeater devices 106. The first repeater device (e.g., the repeater device 106A) may be also referred to as a root node that may interface the master WAP device 104A (i.e., the WAP source) and convert the first WLAN signal into intermediate frequency (IF, which may also be referred to as an Internal Frequency) for a beam mesh downstream. Each of the plurality of repeater devices 106 may be equipped with amplifiers (e.g., power amplifiers) and phase shifters (not shown), which enhances the first WLAN signal received from the master WAP device 104A and relays it over longer distances.

The one or more service WAP devices 108 may be configured to receive the first beam of RF signals in the intermediate frequency band (e.g., mmWave frequency or intermediate frequency in the range of 10-300 GHz) from the one or more second repeater devices (e.g., the repeater devices 106B and 106N) and convert back to the WLAN signal to serve one or more UEs 110 in a data throughput greater than a threshold throughput. The use of plurality of repeater devices 106 extends the coverage area of the master WAP device 104A and one or more service WAP devices 108, allowing them to serve their corresponding UEs in areas that may have poor signal reception or are located farther away from the master WAP device 104A.

The plurality of repeater devices 106 may be disposed as a radio frequency (RF) bridge between the master WAP device 104A and the one or more service WAP devices 108 such that a data propagation path of user data relayed through a network of the plurality of repeater devices 106 may be analog without any digital decoding or encoding of the user data in the first beam of RF signals to reduce latency less than a threshold time. For example, the data propagation path may comprise high-frequency analog circuitry to minimize latency to nanoseconds. Multi-hop relaying of intermediate frequency signals (e.g., mmWave signals) may happen without any digital encoding or decoding of the user data (i.e., payload). Further, a backchannel connectivity and control of the network of the plurality of repeater devices 106 may be via a second WLAN frequency, based on a signal metadata of the first beam of RF signal. The second WLAN frequency may be less than the first WLAN frequency. While the data propagation path may remain entirely analog for lowest latency, the plurality of repeater devices 106 may extract the signal metadata from RF signals for analysis. This allows deriving wireless metrics like timing parameters, signal quality, interference levels, channel state information, and reference signals using digital signal processing (DSP) techniques. Thus, the simplicity and low latency of analog signal relaying is intelligently combined with the flexibility and intelligence of digital processing in a hybrid architecture.

The plurality of repeater devices 106 may serve as a RF communication bridge between the master WAP device 104A and one or more service WAP devices 108, which allows for the analog relay of user data through a network of the plurality of repeater devices 106. The analog transmission of the user data reduces latency because there is no need for digital encoding and decoding processes, which can introduce delays. By transmitting user data (i.e., payload) in its original analog form, the wireless communication system 100A achieves faster transmission times, making it suitable for applications that require real-time communication, such as data streaming, video streaming, online gaming, and the like. Further, separating the data propagation path and control connectivity ensures that control signals do not interfere with the data transmission path. This separation is beneficial for maintaining the quality of service and preventing degradation of the data transmission path. Further, utilizing parallel channels for control and data connectivity allows for simultaneous communication of control signals and data packets. By operating these channels independently, the wireless communication system 100A prevents congestion and ensures that both control and data traffic receive sufficient bandwidth and priority. This parallel approach enhances network stability and reliability, particularly in environments with high data traffic. Furthermore, intermediate frequencies may be Millimeter-wave (mmWave) signals that operate at higher frequencies than traditional Wi-Fi signals, enabling faster data transfer rates and lower latency. By utilizing intermediate frequencies (e.g., mmWave frequencies or other intermediate frequencies in the range of 10-300 GHz) for analog data transmission between the master WAP device 104A and the one or more service WAP devices 108, the wireless communication system 100A achieves low-latency communication, say microseconds, making it ideal for applications that require rapid response times. Furthermore, lower frequency signals typically have better penetration and coverage, making them suitable for control and coordination purposes. By leveraging lower frequency WLAN signals (e.g., Wi-Fi®) signals at 2.4 or 5 GHz) for backchannel communication, a reliable connectivity and coordination among the plurality of repeater devices 106 may be provided. The second WLAN frequency may be in a range of 2.4-5 GHz. Alternatively stated, the intelligent combination of WLAN and mmWave signals enables hybrid coordination, leveraging the strengths of both technologies for optimized network performance. WLAN provides broader coverage and connectivity, while mmWave offers high-speed, low-latency communication. By synergistic integration of the plurality of repeater devices 106 with the modified WAPs (the master WAP device 104A and the one or more service WAP devices 108), the wireless communication system 100A achieves responsive network-wide orchestration, enhancing overall network efficiency and responsiveness.

In accordance with an embodiment, the intermediate frequency band of the first beam of RF signals may be a mmWave frequency in a range of 24-300 GHz or other intermediate frequency in the range of 10-300 GHz. In accordance with an embodiment, first WLAN frequency and the intermediate frequency band of the first beam of RF signals may be one of a licensed mmWave spectrum of a network operator or an unlicensed mmWave spectrum, or a combination thereof. In order to minimize interference, the wireless communication system 100A may be implemented as a wireless mesh network in the licensed mm Wave band, where the communication channels may experience reduced interference as the network's resilience against potential disruptions is enhanced caused by interference from other networks. The exclusive use of dedicated frequencies allows for a more robust and interference-free communication infrastructure using a combination of WLAN frequencies and licensed mmWave frequencies contributing to improved network performance and quality of service.

In accordance with an embodiment, each of the master WAP device 104A and the one or more service WAP devices 108 may be configured to perform Multi-User, Multiple Input, Multiple Output (Mu-MIMO) to corresponding connected UEs via corresponding mmWave New Radio Unlicensed (NR-U) links. The use of millimeter-wave frequencies and Mu-MIMO together may provide high data rates and efficient use of the available spectrum. Millimeter-wave frequencies offer increased bandwidth, and Mu-MIMO enhances the overall network capacity by enabling simultaneous communication with multiple user devices. This can result in improved throughput and reduced latency, contributing to a more robust and high-performance wireless communication system, particularly in the context of 5G NR-U deployments.

In an implementation, an initial connection among different network nodes, such as the master WAP device 104A, the plurality of repeater devices 106, and the one or more service WAP devices 108 may be established using second WLAN frequency of an existing WLAN network for a network topology formation, such as a mesh network configuration or a daisy-chain network configuration, and then a dedicated, high-speed data communication may be established within the intermediate frequency band using a directional beam for increased data rates and lower latency among the plurality of repeater devices 106. When there a line-of-sight between two repeater devices, the intermediate frequency employed for node-to-node communication may be in mmWave frequency and when in some scenarios there is a non-line-of-sight between the two repeater devices, a wired connection may be used for that patch of the network.

In an example, in wireless networking, collision avoidance in wireless networks is a significant problem. Typically, collisions occur when multiple devices attempt to transmit data simultaneously on a shared wireless channel, resulting in corrupted data and reduced network performance. A first conventional and common approach is Carrier Sense Multiple Access with Collision Avoidance (CSMA/CA), where wireless devices listen for other transmissions before sending data. It uses random backoff algorithms to reduce the chance of collisions if multiple devices try to transmit at the same time. A second conventional approach is Clear Channel Assessment (CCA), which verifies if the channel is clear before transmission, using methods like detecting carrier signals or measuring noise levels. A third conventional approach is Request to Send/Clear to Send (RTS/CTS), which involves a handshake between wireless devices, where the sender requests permission to transmit, and the receiver replies if the channel is clear. This is useful for addressing hidden terminals and exposed terminal problems. The "hidden node problem" or "hidden terminal problem" occurs when a node is visible to a wireless access point (WAP), but not to other nodes communicating with that AP. In yet another conventional approach, there is a technique called Multiple Access with Collision Avoidance, where RTS/CTS along with additional mechanisms may be used to avoid collisions in ad-hoc networks. The above conventional techniques, although reduces collision but are known to increase overhead. In the wireless networks, the term "overhead" refers to the resources used for managing, controlling, and signaling information rather than carrying actual user data. Further, traditional wireless backhaul networks have a fixed topology, meaning connections between devices are pre-defined and static.

In contrast to the conventional systems, in accordance with an embodiment, the central cloud server 102 may be configured to cause the plurality of repeater devices 106 to dynamically form a wireless backhaul network topology based on telemetry information received from each of the plurality of repeater devices 106. The wireless backhaul network topology may be one of a wireless backhaul mesh network topology, a wireless-backhaul daisy-chain network topology, or a user-defined wireless backhaul network topology that defines one or more custom combination of the wireless backhaul mesh network topology and the wireless backhaul daisy-chain network topology. In the present disclosure, the wireless communication system 100A may utilize the central cloud server 102 to dynamically adjust the network topology based on real-time or near real time information. The plurality of repeater devices 106 may be configured to dynamically adjust their network topology based on instructions from the central cloud server 102. Further, based on the telemetry information, the central cloud server 102 may be configured to determine how each different types of network node, i.e., the master WAP device 104A, the plurality of repeater devices 106, and the one or more service WAP devices 108 may connect, forming a mesh, daisy-chain, or even a custom hybrid of both. This provides enhanced resilience, where even unforeseen failures in one part of the network may be bypassed by using alternative paths. Furthermore, dynamically forming the wireless backhaul network topology based on telemetry information enables the wireless communication system 100A to implement advanced collision management techniques, such as optimized path selection, real-time collision avoidance, adaptive channel allocation, fault tolerance, and continuous optimization. These capabilities help minimize collisions, improve network efficiency, and enhance reliability and performance.

For example, the central cloud server 102 may be configured to analyze telemetry information from each of the plurality of repeater devices 106 to dynamically select one or more data propagation paths (i.e., optimal data paths) from amongst a plurality of available data propagation paths for data transmission. By considering factors, such as signal strength, interference levels, and network traffic, the central cloud server 102 may be configured to route data along data propagation paths that minimize the risk of collisions and maximize overall network performance. Based on the dynamic adjustment of the network topology in real-time or near real-time, the wireless communication system 100A may be configured to proactively respond to changes in network conditions. If congestion or interference is detected on a particular data propagation path, the central cloud server 102 may be configured to reroute traffic to less congested channels or network nodes, reducing the likelihood of collisions and maintaining consistent multi-gigabit data transmission rates using a labelling scheme (described in detail in FIG. 1B). Further, based on dynamic forming and adjusting of the wireless backhaul network topology, the wireless communication system 100A may be configured to adaptively allocate mmWave channels or other intermediate frequency channels for communication between the plurality of repeater devices 106. The central cloud server 102 may be further configured to monitor telemetry information and adjust the network topology, accordingly, enabling adaptation to changing environmental conditions and network dynamics, ensuring efficient collision avoidance and maximizing network performance.

In accordance with an embodiment, the telemetry information comprises a unique identifier (ID) of each of the plurality of repeater devices 106, a geo-location of each of the plurality of repeater devices 106, an operational state of the plurality of repeater devices 106, and the signal metadata. The operational state of each of the plurality of repeater devices 106 may indicate its status and functionality within the network. This information includes whether each repeater device is active, inactive, undergoing maintenance, or experiencing issues. By monitoring the operational state of each of the plurality of repeater devices 106, the central cloud server 102 may be further configured to identify potential problems or a failure point in the network and take corrective actions, such as rerouting traffic or deploying backup repeater devices, to maintain uninterrupted service and prevent collisions.

In accordance with an embodiment, based on the telemetry information, the central cloud server 102 may cause beam alignment and link optimization among the plurality of repeater devices 106. The beam alignment and link optimization may be understood by taking examples of two repeater devices. The process may begin with the selection of a pair of repeaters to establish a new link connection in the wireless network. Once identified, the first repeater (e.g., the repeater device 106A) may activate a synchronization signal blocks (SSB) generator, which initiates the transmission process. This generator enables the transmission of an SSB signal omni-directionally, incorporating specific link parameters necessary for establishing the upcoming link. On the receiving end, the second repeater device (e.g., the repeater device 106B) may utilize an SSB decoder to scan its surroundings, covering a full 360-degree range, in search of the SSB signal transmitted by the first repeater device. Upon detection of the SSB signal, the second repeater device may lock onto the first SSB signal instance and extract embedded metadata. This metadata may useful information regarding the impending link, including directional cues and transmission parameters. Based on the extracted metadata, the second repeater device (e.g., the repeater device 106B) may proceed to estimate the angle of arrival of the mmWave signal. Based on the determined angle of the arrival, the second repeater device (e.g., the repeater device 106B) may activate its beamformer to electronically steer a beam of RF signals towards the direction of the first repeater device. This precise electronic steering ensures the establishment of a directed beam link, enhancing the efficiency and reliability of the connection. Concurrently, the second repeater device (e.g., the repeater device 106B) may provide feedback to the first repeater device, relaying optimal angle and power level recommendations based on its analysis. Upon receiving this feedback, the first repeater device may be configured to adjust its own beamformer settings, aligning its transmission beam with the optimized direction towards the second repeater device. Both repeaters may engage in continuous optimization, dynamically adjusting beam alignment and power levels to maintain peak performance and mitigate potential signal degradation. The central cloud server 102 may be configured to establish a feedback loop with the plurality of repeater devices 106 by exchanging information on link performance and network status. This feedback loop enables the central cloud server 102 to fine-tune coordination strategies based on real-world performance metrics, further enhancing network efficiency and reliability. Further, to facilitate coordinated transmission, Time-Division Duplex (TDD) synchronization may be activated, ensuring efficient time slot coordination between the plurality of repeater devices 106. repeaters. Once testing confirms successful link establishment and optimization, the directed beam link between the plurality of repeater devices 106 may be fully operational, contributing to the overall efficiency and performance of the wireless network.

In accordance with an embodiment, the central cloud server 102 may be further configured to control the network of the plurality of repeater devices 106 to schedule transmit and receive time slot assignments to a plurality of access point devices and the one or more UEs 110 over the backchannel connectivity, wherein the plurality of access point devices comprises the master WAP device 104A and the one or more service WAP devices 108. The master WAP device 104A and the one or more service WAP devices 108 may directly communicate with the one or more UEs 110 to provide wireless connectivity to the one or more UEs 110. The central cloud server 102 may act as a centralized scheduler that may schedule transmit and receive time slot assignments to the plurality of access points (e.g., the master WAP device 104A and the one or more service WAP devices 108) and the one or more UEs 110 over the backchannel connectivity, for example, over the second WLAN signal (e.g., lower Wi-Fi® frequencies such as 2.4 GHz or 5 GHz frequency). Such scheduling maximizes interference-free concurrent downlink and uplink capacity allocation adapting to traffic demand dynamically. This interference mitigation may be useful to ensure reliable and efficient communication, particularly in scenarios where multiple UEs, such as the one or more UEs 110 or client devices share the same frequency spectrum, for example, 6-9 GHz frequencies. Further, as the demand for uplink or downlink capacity changes, the central cloud server 102 may be configured to adjust the allocation of the time slots accordingly to the one or more UEs 110, optimizing resource usage and network performance.

In accordance with an embodiment, the central cloud server 102 may be further configured to align radio frames between each pair of the plurality of repeater devices 106 to a common reference time. It is observed that different oscillator clocks in the plurality of repeater devices 106 drift over a period of time. The monitoring process generates a feedback signal that provides information about any discrepancies or drift observed in the timing. This feedback signal is then used to make real-time adjustments to maintain accurate synchronization. Thus, continuous minor timing adjustments may be made over time to maintain perfect beam alignment. Each repeater device of the plurality of repeater devices 106 may be configured to extract the signal metadata, which may include timing information from the synchronization signal blocks (SSB). The central cloud server 102 may enable precise time slot coordination for latency-sensitive applications. In an implementation, the downlink versus uplink slots per frame may be dynamically adjusted based on the timing information. The central cloud server 102 may be configured to cause the plurality of repeater devices 106 to adjust and optimize for higher downlink capacity during peak hours when demand is higher and rebalance to more uplink slots when traffic patterns change.

In accordance with an embodiment, the central cloud server 102 may be configured to cause the master WAP device 104A to arbitrate a seamless handoffs for the one or more UEs 110 roaming across the one or more service WAP devices 108 connected to the one or more second repeater devices (e.g., the repeater devices 106B and 106N). The master WAP device 104A may be connected to the fiber backhaul (i.e., the data source 112), which refers to a high-capacity, fiber-optic communication link. This robust and high-speed backhaul connection ensures efficient data transfer between the master WAP device 104A and the broader network, including the Internet or other network resources, such as an Ethernet. The central cloud server 102 may be configured to cause the master WAP device 104A to arbitrate the seamless handoffs to maintain continuous connectivity for the one or more UEs 110 (e.g., smartphones, laptops) when the one or more UEs 110 transitions between coverage areas served by different service WAPs, such as the one or more service WAP devices 108. The central cloud server 102 may cause the master WAP device 104A to ensure that the handoff is smooth, without disruptions or noticeable drops in connectivity for the roaming users. In an example, when the central cloud server 102 determines that a handover is necessary due to the user's movement (i.e., movement of the one or more UEs 110), it initiates a handover decision, which may include selecting a new beam or a new service WAP device that provides optimal connectivity for the user's current location. As the one or more UEs 110 starts moving, the central cloud server 102 may be configured to track the device's location based on the telemetry data and cause the one or more service WAP devices 108 to adjust the communication beams accordingly. In some implementations, the one or more service WAP devices 108 may be configured to propagate waveforms corresponding to the same SSID (service set identifier). In this case, no SSID handoff is required when one UE transitions from the service WAP device 108A coverage domain onto the service WAP device 108B coverage.

In accordance with an embodiment, the central cloud server 102 may be configured to cause the network of the plurality of repeater devices 106 to change the wireless backhaul network topology based on a change in signal metrics in the telemetry information received from each of the plurality of repeater devices 106. Based on the analysis of the signal metrics in the telemetry information, the central cloud server 102 may be configured to determine one or more network topology adjustments to the wireless backhaul network topology. For example, the central cloud server 102 may be configured to reroute traffic, establish new connections, or modify the configuration of the network of the plurality of repeater devices 106. The central cloud server 102 may communicate specific instructions to specific repeater devices of the plurality of repeater devices 106 to implement dynamic changes in routing paths. This may involve reconfiguring connections between the master WAP device 104A, changing a mesh topology for a new data propagation path, and connection between one of the plurality of repeater devices 106 and one of the service WAP device 108. The central cloud server 102 may ensure that the chosen wireless backhaul network topology maintains low latency, where the user data is relayed from source to destination within a specified threshold time.

In accordance with an embodiment, each of the plurality of repeater devices 106 may be configured to extract the signal metadata by digital signal processing of a portion of the first beam of RF signals without decoding the user data of the first beam of RF signal. The signal metadata comprises two or more of timing information associated with a radio frame of the first beam of RF signal, system information, channel state information, a cell identity (ID), a beam ID, a signal strength, a signal to noise ratio (SNR), an interference level, or other signal quality metrics. The signal metadata may be communicated to the central cloud server 102 as a part of the telemetry information. The processor 102A may be configured to feed the telemetry information to the neural network model 102B for processing and network-wide optimization. The neural network model 102B may process the data to coordinate beam routing in the plurality of repeater devices 106. Based on the signal metadata, such as signal strength, SNR, the interference level, or other signal quality metrics (e.g., Effective Isotropic Radiated Power (EIRP), antenna gain, Free Space Loss, path loss, transmit power, etc.), the processor 102A may be further configured to determine link budget based on transmit and receive characteristics of each of the plurality of repeater devices 106, the one or more master WAP devices 104, and the one or more service WAP devices 108. The processor 102A may be further configured to identify one or more interference zones within the wireless network. In response to identified interference zones, the processor 102A may be further configured to dynamically adjust network parameters, such as frequency channels or transmission power, to mitigate the impact of interference. Further, the processor 102A may be further configured to cause the plurality of repeater devices 106 to configure phase shifters settings, such as phase adjustment values, across the plurality of repeater devices 106 to control the direction of the transmitted beams, allowing for dynamic adjustments to the coverage area or target direction of the signals.

Figure 1B:
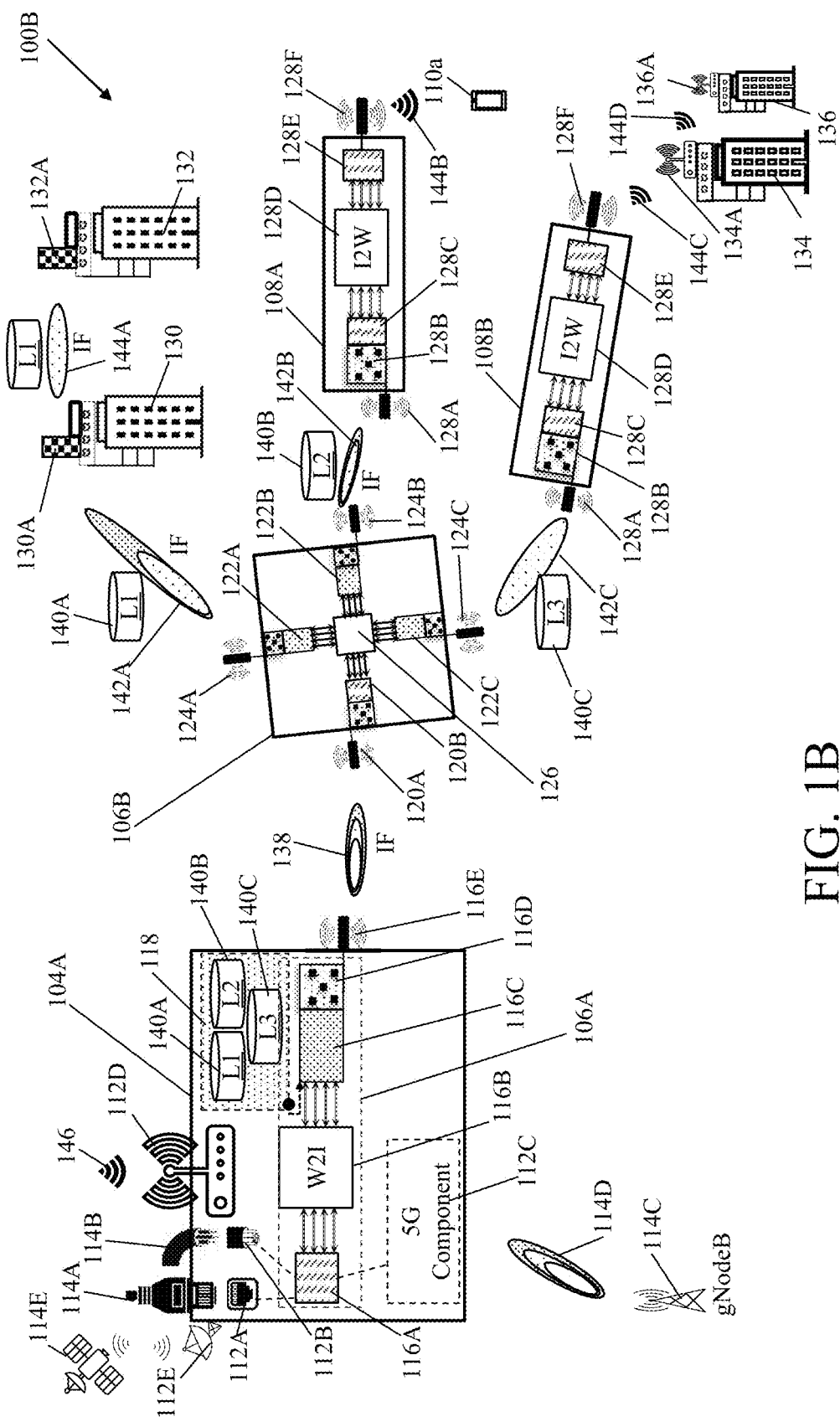
FIG. 1B is a diagram that illustrates an exemplary implementation of a wireless communication system with a repeater device configured as a switch node, in accordance with an exemplary embodiment of the disclosure.

FIG. 1B is a diagram that illustrates an exemplary implementation of a wireless communication system with a repeater device configured as a switch node, in accordance with an exemplary embodiment of the disclosure. FIG. 1B is explained in conjunction with elements from FIG. 1A. With reference to FIG. 1B, there is shown a wireless communication system 100B. The wireless communication system 100B may include the master WAP device 104A (also referred to as a master node), the repeater device 106B configured as a switch node, and the one or more service WAP devices 108, such as the service WAP device 108A and the service WAP devices 108B.

In this embodiment, the master WAP device 104A may include one or more of an Ethernet port 112A, an optical fiber port 112B, a 5G component 112C, or a satellite signal receiver 112E. Thus, the data source 112 (of FIG. 1A) may be one or more of the Ethernet port 112A, the optical fiber port 112B, the 5G component 112C, or the satellite signal receiver 112E for the Internet connection (data backhaul). The Ethernet port 112A may be connected to an Ethernet cable connector 114A of an Ethernet cable, the optical fiber port 112B may be connected to an optical fiber 114B, the 5G component 112C may include a 5G modem and a donor phase array antenna configured to establish a connection to a gNodeB 114C for 5G network. The donor phase array antenna of the 5G component 112C may receive a 5G or 6G mmWave cellular signal 114D from the gNodeB 114C (or a small cell or other radio access network (RAN) node). The satellite signal receiver 112E may receive input signal from a satellite 114E for the Internet connectivity.

In this embodiment, the master WAP device 104A may further include a WLAN Fast Ethernet (FE) port 116A, a frequency converter 116B, a service port 116C, and an antenna patch 116D connected to a phased array antenna 116E. The antenna patch 116D may be an antenna chipset, an analog front-end circuitry, or antenna module configured to support both vertical and horizontal beams via the phased array antenna 116E, which may be a high-gain antenna. The components, such as the WLAN FE port 116A, the frequency converter 116B, the service port 116C, the antenna patch 116D connected to the phased array antenna 116E, may collectively perform the function of root node (i.e., the repeater device 106A configured as a root node). Further, the master WAP device 104A may include a wireless access point 112D (which may include WLAN chipset and WLAN antennas). Thus, alternatively stated, the master WAP device 104A may include the functionalities of the root node (i.e., the repeater device 106A configured as a root node) and a source wireless access point (or Wi-Fi® Access point source, such as the wireless access point 112D). In other words, the repeater device 106A configured as a root node may be integrated in the master WAP device 104A. The master WAP device 104A using the wireless access point 112D may support Wi-Fi® 6, 7 or 8 and may be backward compatible with previous Wi-Fi® frequencies. Furthermore, the master WAP device 104A may include a satellite signal receiver 112E from a satellite 114E.

The master WAP device 104A may further include a label injector 118, which may be configured to insert a label to each data frame of a plurality of data frames received from the data source 112.

The repeater device 106B configured as a switch node, may include a donor antenna 120A connected to a donor port 120B. The donor port 120B may be connected to the donor antenna 120A at one end and a switch circuit 126 at the other end. The repeater device 106B may further include a plurality of service ports 122A, 122B, and 122C. Each service port may be connected to one service phased antenna array of the plurality of service phased antenna arrays 124A, 124B, and 124C (as shown in the FIG. 1B in an example). The plurality of service phased antenna arrays 124A, 124B, and 124C of the repeater device 106B may be disposed at a plurality of different positions in the repeater device 106B. For example, the plurality of service phased antenna arrays 124A, 124B, and 124C may be disposed at approximately 90 degree apart from each other when the repeater device 106B has the shape of a square (a square box). In such a case, each phased antenna array may be arranged at one side of the square.

Furthermore, the repeater device 106B configured as a switch node may be a network node that acts as a radio frequency (RF) bridge between an upstream neighboring network node and a plurality of downstream neighboring network nodes. The donor port 120B may connect the switch node to the upstream neighboring network node (e.g., the master WAP device 104A) and receive an intermediate frequency (IF) signal from the upstream neighboring node (e.g., the master WAP device 104A). The plurality of service ports 122A, 122B, and 122C may connect to the plurality of downstream neighboring nodes, such as the service WAP device 108A and the service WAP devices 108B. The switch circuit 126 may be provided at the core of the repeater device 106B configured as the switch node. The switch circuit 126 may be configured to forward the received RF beams from the donor port 120B to the appropriate service port of the plurality of service ports 122A, 122B, and 122C based on the target UE address or the label. The repeater device 106B configured as the switch node may be a repeater device.

Each of the one or more service WAP devices 108, such as the service WAP device 108A and the service WAP devices 108B, may also be referred to as an access node or access repeater device. Each of the one or more service WAP devices 108, such as the service WAP device 108A and the service WAP devices 108B, may include a phased array antenna 128A integrated with an antenna patch 128B, a donor port 128C, a frequency converter 128D, a WLAN FE port 128E. The antenna patch 128B may be an antenna chipset, an analog front-end circuitry, or antenna module configured to support both vertical and horizontal beams via the phased array antenna 128A, which may be a high-gain antenna. The WLAN FE port 128E may be connected to one or both of a plurality of WLAN antennas or a phased array antenna 128F. Each of the one or more service WAP devices 108, such as the service WAP device 108A and the service WAP devices 108B, may be configured as an access node, which acts as a remote WLAN antenna (e.g., a remote Wi-Fi® Antenna) for the master WAP device 104A, extending the Wi-Fi coverage area. Each of the one or more service WAP devices 108 when configured as an access node, may be configured to transform the intermediate frequency (IF) signal received from an upstream neighboring nodes, such as the switch nodes (SNs), into WLAN signals (e.g. Wi-Fi®) signals) that may be compatible to be exchanged with other Wi-Fi stations (STAs) or client devices. Further, the one or more service WAP devices 108 when configured as the access node, are configured to perform user data exchange over WLAN signals, for example, the access node enables Wi-Fi STAs or client devices to exchange Wi-Fi data (user data over WLAN signals) with the source, i.e., the master WAP device 104A through the access node. The access node may include a donor complex, which is responsible for receiving the IF signal from the upstream neighboring nodes and translating it into Wi-Fi signals for transmission to the STAs or client devices, and vice versa (receiving Wi-Fi signals from STAs or client devices and converting them into IF signals for upstream transmission).

In the FIG. 1B, there is further shown a plurality of buildings, such as building 130 132, 134, and 136, where a distributed antenna system (DAS), for example, a passive DAS may be installed for distribution of WLAN signals and/or 5G signals within the building 130 132, 134, and 136, in the wireless backhaul network of the wireless communication system 110B. Each building 130 132, 134, and 136 may include a corresponding donor antenna 130A, 132A, 134A, and 136A of the DAS installed at a position (e.g., rooftop or near window) in the building 130 132, 134, and 136, where a line-of-sight (LOS) may be possibly established with the one or more service WAP devices 108.

In operation, the master WAP device 104A configured to insert a label (e.g., label L1, L2, or L3) to each data frame of a plurality of data frames 140A, 140B, and 140C received from the data source 112. The label comprises routing information for the plurality of data frames 140A, 140B, and 140C for routing the plurality of data frames 140A, 140B, and 140C within a wireless backhaul network. The data source 112 (for example, one or more of the Ethernet port 112A, the optical fiber port 112B (or coaxial cable port), the 5G component 112C, or the satellite signal receiver 112E) may be configured to connect the master WAP device 104A to a higher bandwidth backhaul, for example, with terabytes or multigigabits data rate. The master WAP device 104A may be operating in a scenario where it needs to handle a large volume of data frames from the data source 112 and distribute them efficiently over the wireless backhaul network. In an example, data signals from the different ports, such as the Ethernet port 112A, the optical fiber port 112B, or the 5G component 112C may be aggregated and encapsulated into a common data format or protocol stack compatible with the WLAN FE port 116A of the master WAP device 104A. For example, if the Ethernet port 112A is carrying Ethernet frames, and the optical fiber port 112B is carrying Fiber Channel frames for Wi-Fi® signals, separate protocol converters can be used to convert both data streams into a common format supported by the WLAN FE port 116A.

Alternatively, only one port may be active, and in such a case, the data signal may be converted to the common data format or protocol stack compatible with the WLAN FE port 116A. The frequency converter 116B of the master WAP device 104A may be configured to convert the WLAN signals (data signals received from the data source 112) to intermediate frequency (IF) for the beam mesh downstream. The service port 116C may receive the data signal in the intermediate frequency. The label injector 118 may be connected to the service port 116C, where label insertion may be performed. The master WAP device 104A may be configured to insert one label (e.g., label L1, L2, or L3) to each data frame of the plurality of data frames 140A, 140B, and 140C using the label injector 118.

In an example, each label (e.g., the label L1, L2, and L3) may be inserted as a tag or identifier attached to a data frame. For example, one label (e.g., the label L1, L2, and L3) may be inserted to one data frame in a physical Layer Convergence Procedure (PLCP) preamble of the data frames, which may be WLAN data frames (e.g., Wi-Fi data frames). To inject labels at the preamble level without requiring Layer 2 or Layer 3 decoding, the label injector 118 may modify one or more of the fields within the PLCP preamble to carry the label including routing information. The label injector 118 may be configured to modify the preamble of the plurality of data frames 140A, 140B, and 140C (e.g., Wi-Fi-like data frames) to encode the label or routing information, which may include a destination node identifier or a quality-of-service (QOS) priority level for each of the data frames.

In another example, in Wi-Fi 6 (802.11ax) and Wi-Fi 7 (802.11be), a preamble puncturing is a technique that allows for the modification of certain preamble fields or sequences without disrupting the overall preamble structure and functionality. This feature is primarily intended for multi-user and multi-AP coordination, but it is observed during experimentation that preamble puncturing may be re-purposed and utilized for label injection in the wireless backhaul network scenario. For example, in the Wi-Fi 6 and Wi-Fi 7 preambles may consist of several fields, including the Legacy Training Field (L-TF), High Efficiency (HE) Preamble, and Signal Fields (SIG-A, SIG-B, and potentially SIG-C in Wi-Fi 7). The label injector 118 may be configured to puncture or modify specific subfields or sequences within the HE Preamble to insert or encode the label (l1, L2, or L3) for routing information. The HE Preamble may include fields like the HE-SIG-A, HE-STF, and HE-LTF, which can be punctured while maintaining compatibility with legacy Wi-Fi devices. Alternatively, or in addition to puncturing the HE Preamble, the label injector 118 may puncture or modify specific subfields or reserved bits within the Signal Fields (SIG-A, SIG-B, and potentially SIG-C in Wi-Fi 7) to carry the label (L1, L2, or L3) for routing information. In yet another implementation, the label injector 118 may modulate or encode the label onto the preamble signal itself, using techniques like phase modulation, frequency modulation, or spread spectrum techniques. Thus, by leveraging preamble puncturing in Wi-Fi 6 and Wi-Fi 7, the label injector can modify specific preamble fields or sequences in data frames to carry the label without disrupting the overall preamble structure and functionality. This approach does not require lower layer decoding of the frames, as the label may be embedded directly into the preamble. For instance, Layer 2 decoding, Layer 3 decoding, or decoding of MAC header or user data (payload) is not required to extract the inserted label (e.g., L1, L2, or L3) at the receiver side.

In yet another example, in Wi-Fi 6 (802.11ax) preamble structure of data frames, a suitable field for inserting labels with minimal or no disruption to the data frames and without requiring decoding of the header or user data may be High-Efficiency Signal A (HE-SIG-A) field. The HE-SIG-A field may be a part of the preamble and does not require decoding of the MAC header or user data payload. It can be interpreted and processed at the Physical Layer (PHY) level, without higher-layer decoding. The HE-SIG-A field may have several subfields and reserved bits that can potentially be repurposed or punctured to carry the label (L1, L2, or L3) without disrupting the overall structure and functionality of the field. By modifying the HE-SIG-A field to carry labels, the receiving network nodes in the wireless backhaul network may be configured to extract and utilize the label information without requiring any additional decoding or processing. For example, the HE-SIG-A field may include subfields dedicated to carrying addressing information, such as the "Partial Bandwidth (BW) Info" subfield, which may be repurposed or extended to include the destination node identifier for each data frame. Alternatively, unused or reserved bits within the HE-SIG-A field may be allocated to carry the destination node identifier. For QoS priority level, the HE-SIG-A field may include subfields related to QoS control, such as the "QoS Control" subfield, which may be used to indicate the QoS priority level for each data frame. If more granular QoS priority levels are required, additional bits or subfields within the HE-SIG-A may be allocated for this purpose. Further, since the labels (e.g., L1, L2, or L3) may carry both the destination node identifier and QoS priority level for each data frame of the plurality of data frames 140A, 140B, and 140C, an efficient encoding scheme may be used to minimize the overhead and maximize the available space within the HE-SIG-A field.

In yet another implementation, in an example, alternatively, the HE-SIG-B field may be employed to carry labels where reserved bits or puncturing techniques within the HE-SIG-B field may be used to insert the labels in the plurality of data frames 140A, 140B, and 140C. In yet another example, a new custom field may be defined within the HE Preamble dedicated to carrying a label including routing information, antenna beam selection indicators, and polarization selection indicators. In yet another example, a combination of the above techniques, such as using the HE-SIG-A field for routing information and a custom field for antenna beam and polarization selection indicators may be employed.

The phased array antenna 116E may be configured to direct a first beam of RF signals 138 carrying the plurality of data frames 140A, 140B, and 140C with corresponding unique label (L1, L2, or L3) inserted in each of the plurality of data frames 140A, 140B, and 140C. The donor antenna 120A of the repeater device 106B may be configured to obtain the first beam of RF signals 138 from a first direction from an upstream neighboring node in the wireless communication system 100B. In this embodiment, the upstream neighboring node may be the master WAP device 104A. The first beam of RF signals 138 may carry the plurality of data frames 140A, 140B, and 140C, where each data frame may have corresponding labels (L1, L2, or L3). The donor antenna 120A of the repeater device 106B may be positioned and oriented to receive the first beam of RF signals 138 from the direction of the phased array antenna 116E of the master WAP device 104A.

In accordance with an embodiment, the switch circuit 126 may be further configured to receive the first beam of RF signals 138 via the donor port 120B. The donor port 120B may be connected to the donor antenna 120A at one end and the switch circuit 126 at the other end. The switch circuit 126 may be configured to detect a label (e.g., labels L1, L2, and L3) in a preamble of each data frame of a plurality of data frames 140A, 140B, and 140C carried by the first beam of RF signals 138 independent of decoding other header information (e.g., any other header portion or MAC header other than the label) and user data (e.g. payload) in the each data frame of the plurality of data frames 140A, 140B, and 140C. The switch circuit 126 may be designed to specifically look for and extract these labels from the preamble of the received data frames, such as the plurality of data frames 140A, 140B, and 140C without any lower layer decoding (e.g., without the need to decode the MAC header or the payload of the data frames to extract the labels). In other words, the switch circuit 126 may be configured to process only the relevant preamble fields or sequences where the labels are encoded, without parsing or decoding the remaining portions of the data frames. By detecting the labels (e.g., labels L1, L2, and L3) in the preamble independently of decoding other header information and user data, the switch circuit 126 can efficiently and quickly obtain the necessary routing information for each data frame, enabling the repeater device 106B to forward the data frames to the appropriate downstream nodes without incurring the overhead of full data frame decoding, thereby significantly reducing the processing overhead and complexity for the switch circuit 126. This approach provides ultra-low latency traffic routing and may be beneficial in scenarios where the data frames are carrying high-bandwidth or high-throughput traffic, as decoding the entire data frame for every data frame would be computationally expensive and potentially introduce bottlenecks.

In accordance with an embodiment, the label may include routing information that indicates at least one of a destination node identifier or a quality-of-service priority level for each of the plurality of data frames 140A, 140B, and 140C. The routing information indicates how each data frame may be forwarded within the wireless backhaul network. The destination node identifier may identify the intended destination node or nodes to which the data frame should be delivered. The quality-of-service priority level may indicate the priority level assigned to the data frame based on its importance or required level of service. Different data frames may have varying quality-of-service priorities, allowing the network to prioritize the transmission of critical or time-sensitive data over less urgent traffic. The quality-of-service priority level may determine which data frames are to be queued and which data frames shall be instantly forwarded.

In an implementation, the label may further indicate at least one of an antenna beam selection indicator associated with the plurality of service phased antenna arrays 124A, 124B, and 124C or a polarization selection indicator for each of the plurality of data frames 140A, 140B, and 140C. In this implementation, the label may further specify which antenna beam may be selected for transmitting or receiving each data frame. The antenna beam selection indicator within the label ensures that a given data frame may be transmitted or received using the most appropriate antenna beam(s) for optimal communication performance, taking into account factors such as signal strength, interference, and coverage. The polarization selection indicator may determine the polarization of the electromagnetic waves used to transmit each data frame. Polarization refers to the orientation of the electric field component of the wave relative to the Earth's surface. The polarization types may include horizontal and vertical polarization. By including a polarization selection indicator within the label, the wireless communication system 100B may specify the desired polarization for each data frame. This allows for the optimization of signal transmission by aligning the polarization of the transmitted waves with the characteristics of the receiving antennas and minimizing signal degradation due to polarization mismatch.

The switch circuit 126 may be further configured to switch the plurality of data frames 140A, 140B, and 140C based on the detected label (e.g., L1, L2, or L3) in the each data frame of the plurality of data frames 140A, 140B, and 140C such that each data frame may be routed to a corresponding service phased antenna array of the plurality of service phased antenna arrays 124A, 124B, and 124C. The plurality of service phased antenna arrays 124A, 124B, and 124C may be disposed at the plurality of different positions in the repeater device 106B. The detected labels may include various parameters such as destination node identifiers, quality-of-service priorities, antenna beam selection indicators, and/or polarization selection indicators. Based on the contents of the label, the switch circuit 126 may decide which service phased antenna array of the plurality of service phased antenna arrays 124A, 124B, or 124 within the repeater device 106B may receive a given data frame so that it the given data frame reaches its intended destination node for consumption. The switch circuit 126 may include RF switching fabric, which may include a network of switches that may selectively route RF signals from input ports (the donor port 120B) to output ports (service ports 122A, 122B, and 122C) based on indicators in the detected label. When the switch circuit 126 makes routing decisions based on the content of the detected label associated with each data frame, it sends corresponding control signals to the RF switch fabric. Upon receiving the control signals, the RF switch fabric dynamically configures its switches to route each data frame to the appropriate service port connected to the desired service phased antenna array. Beneficially, the switch circuit 126 enables ultra-low latency data frames routing by just detecting the labels and ignoring other headers and user data in each data frame, which significantly improves data propagation speed in different data propagation paths in the wireless backhaul network without any network or signal processing overload. In an implementation, the label detection may be in analog domain. In another implementation, the label detection may be in digital domain where the switch circuit 126 may look for the label in a specific portion of the preamble of data frames while ignoring or without decoding other header information (MAC or IP addresses) and user data.

In accordance with an embodiment, each service port of the plurality of service ports 122A, 122B, and 122C may be connected to one service phased antenna array of the plurality of service phased antenna arrays 124A, 124B, and 124C. This connection establishes the link between the switch circuit 126 and the antenna arrays, such as the plurality of service phased antenna arrays 124A, 124B, and 124C, facilitating the transmission and reception of data signals. The switch circuit 126 may be further configured to route the plurality of data frames 140A, 140B, and 140C to a corresponding service port of the plurality of service ports 122A, 122B, and 122C based on the detected label in each data frame of the plurality of data frames 140A, 140B, and 140C. The switch circuit 126 may dynamically configure its switches to route each data frame to the appropriate service port connected to the desired service phased antenna array. For example, the data frame 140A may be switched and routed to the service port 122A connected to the service phased antenna arrays 124A to reach its intended destination node within the building 132 for consumption via the donor antenna 132A. Similarly, the data frame 140B may be switched and routed to the service port 122B connected to the service phased antenna arrays 124B to reach its intended destination node, such as the UE 110a for consumption via the service WAP device 108A. Similarly, the data frame 140C may be switched and routed to the service port 122C connected to the service phased antenna arrays 124C to reach its intended destination node in the building 136 for consumption via the donor antenna 136A of the DAS.

The switch circuit 126 may be further configured to communicate, via the plurality of service phased antenna arrays 124A, 124B, and 124C, a plurality of second beams of RF signals 142A, 142B, and 142C in a plurality of different directions different from the first direction towards a plurality of different downstream neighboring nodes. In accordance with an embodiment, each the plurality of different downstream neighboring nodes may be one of the service WAP device 108A or 108B or another switch node. Each of the plurality of second beams of RF signals 142A, 142B, and 142C may be configured to carry at least one data frame of the plurality of data frames 140A, 140B, and 140C in a plurality of different data propagation paths in the wireless communication system 100B based on the switch of the plurality of data frames 140A, 140B, and 140C and the detected label in the each data frame of the plurality of data frames 140A, 140B, and 140C. Thus, instead of inspecting full packet headers at every hop (network node), data frames are given a label at ingress (e.g., the master WAP device 104A in this case) indicating their destination node. This label allows the repeater devices, such as switch nodes, to quickly forward frames along the right path without decoding full headers, reducing latency. Further, during congestion, high priority traffic can be identified by its label and forwarded faster, while low priority traffic is queued. This allows managing latency and improving data quality for latency-sensitive applications like voice, video, AR/VR etc. Further, since the labels (L1, L2, or L3) may indicate the destination node identifier, data traffic may be intelligently distributed across multiple mesh nodes covering an area. Such intelligent distribution enables load balancing across nodes to alleviate congestion hotspots. Furthermore, the intermediate frequency links (e.g., mm Wave links) may leverage the same labeling to route traffic without decoding overheads.

In an example, the second beam of RF signal 142A communicated by the service phased antenna array 124A may carry the data frame 140A towards the neighboring node, such as the donor antenna 130A installed in the building 130. The communication between the service phased antenna array 124A and the donor antenna 130A may be a mmWave beam communication, such as the second beam of RF signal 142A operating in a mmWave frequency. Further, the communication between the donor antenna 130A and the donor antenna 132A may be a mmWave-to-mmWave beam communication, via a beam of RF signals 144A in the mmWave frequency or other IF (e.g., 7 to 300 GHz). In another example, the second beam of RF signal 142B communicated by the service phased antenna array 124B may carry the data frame 140B towards the neighboring node, such as the service WAP device 108A, to finally reach its intended destination node, such as the UE 110a for consumption via the service WAP device 108A.

In accordance with an embodiment, the phased array antenna 128A of the service WAP device 108A may be configured to receive the second beam of RF signal 142B in the intermediate frequency (e.g. mm Wave frequency). The frequency converter 128D may be configured to receive the second beam of RF signal 142B from the donor port 128C and convert the intermediate frequency to a WLAN frequency (e.g., a Wi-Fi® signal) and pass to the WLAN FE port 128E. The WLAN FE port 128E may be connected to one or both of a plurality of WLAN antennas or a phased array antenna 128F which may relay a WLAN signal 144B (e.g., in 5, 6, or 7 GHz frequency) carrying the data frame 140B to the UE 110a. Similarly, for upstream transmission, the phased array antenna 128F may receive Wi-Fi signals from the UE 110a and convert into IF signals for upstream transmission.

In yet another example, the second beam of RF signal 142C communicated by the service phased antenna array 124C may carry the data frame 140C towards the neighboring node, such as the service WAP device 108B, to finally reach its intended destination node in the building 136 via the donor antenna 136A. The data propagation path followed may be the repeater device 106B to the service WAP device 108B and further to the donor antenna 134A and to reach to the donor antenna 136A. The communication between the phased array antenna 128F of the service WAP device 108B and the donor antenna 134A may be a Wi-Fi® to Wi-Fi® signal communication, such as a WLAN signal 144C. Further, the communication between the donor antenna 134A on the building 134 and the donor antenna 136A on the building 136 may be Wi-Fi® to Wi-Fi® signal communication, such as a WLAN signal 144D that carries the data frame 140C.

In accordance with an embodiment, the repeater device 106B may include a memory configured to store local active neighboring network nodes positions mapping (LANNNPM) information. The switch circuit 126 may be further configured to update the LANNNPM information when the upstream neighboring node or any one of plurality of different downstream neighboring nodes may be deactivated or a new upstream or downstream neighboring node may be activated for participation in a wireless backhaul network of the wireless communication system 100B. The LANNNPM information enables maintaining an up-to-date mapping of active neighboring nodes and using that mapping along with the labeling scheme to efficiently route data frames in the wireless backhaul network (e.g., a wireless backhaul mesh network). The LANNNPM information may include information about the positions or locations of active upstream and downstream neighboring nodes that the repeater device 106B may communicate with. The switch circuit 126 (or a controller in the repeater device 106B) may be further configured to update the LANNNPM information based on a control instruction received from the central cloud server 102. The LANNNPM information may be updated when there may be a change in a network topology of the wireless backhaul network. For example, when an upstream or downstream neighboring node may turn offline or deactivate or when a new upstream or downstream neighbor node may join the wireless backhaul network and may be activated to communicate with the repeater device 106B. Beneficially, maintaining this up-to-date mapping in the LANNNPM information may be useful because the routing decisions need to adapt to the current active topology of the wireless mesh network and without it, data frames may be forwarded to inactive nodes, leading to failed transmissions. Further, the update of the LANNNPM information based on the control instruction received from the central cloud server 102, allows the central cloud server 102 to disseminate topology changes or updates to the mapping across the distributed mesh nodes, ensuring a consistent operation of the active wireless mesh network.

In accordance with an embodiment, the plurality of data frames 140A, 140B, and 140C may be segregated and routed to a corresponding service phased antenna array of the plurality of service phased antenna arrays 124A, 124B, and 124C further based on the LANNNPM information and the detected label. By combining the label-based routing with the LANNNPM information (active neighbor mapping), the switch circuit 126 or the controller may be configured to determine a precise downstream antenna array to beam the frame towards the intended next-hop active neighbor. This maximizes the chances of successful frame delivery while avoiding inactive nodes. The routing of the plurality of data frames 140A, 140B, and 140C based on the LANNNPM information and the detected label may be beneficial in several ways. For example, the network can self-adjust and continue operating seamlessly when nodes go offline or new ones join. Further, even with localized node failures, the wireless backhaul network may re-route data traffic through alternate paths comprised of active nodes. Furthermore, the central cloud server 102 may propagate updates to node mappings across the distributed mesh, maintaining a coherent network view and operation.

In another aspect, the wireless communication system 100B may include the master WAP device 104A configured to insert the label to each data frame of a plurality of data frames 140A, 140B, and 140C received from the data source 112, where the label comprises routing information for the plurality of data frames 140A, 140B, and 140C for routing the plurality of data frames 140A, 140B, and 140C within the wireless backhaul network. The plurality of repeater devices 106 may be disposed at a plurality of different locations, where at least one repeater device 106B of the plurality of repeater device 106 may include the donor antenna 120A configured to obtain the first beam of RF signals 138 from a first direction from the upstream neighboring node in the wireless backhaul network. In accordance with an embodiment, the upstream neighboring node may be one of the master WAP device 104A, a root node, or another switch node. The repeater device 106B may further include the plurality of service phased antenna arrays 124A, 124B, and 124C disposed at a plurality of different positions in each repeater device 106B. The repeater device 106B may further include the switch circuit 126 configured to detect a label in the preamble of each data frame of the plurality of data frames 140A, 140B, and 140C carried by the first beam of RF signals 138 independent of decoding other header information and user data in each data frame of the plurality of data frames 140A, 140B, and 140C. In accordance with an embodiment, the label may include routing information that indicates at least one of a destination node identifier or a quality-of-service priority level for each of the plurality of data frames 140A, 140B, and 140C, an antenna beam selection indicator associated with the plurality of service phased antenna arrays 124A, 124B, and 124C, or a polarization selection indicator for each of the plurality of data frames 140A, 140B, and 140C. The switch circuit 126 may be further configured to switch the plurality of data frames 140A, 140B, and 140C based on the detected label in the each data frame of the plurality of data frames 140A, 140B, and 140C such that each data frame may be routed to a corresponding service phased antenna array of the plurality of service phased antenna arrays 124A, 124B, and 124C. The switch circuit 126 may be further configured to communicate, via the plurality of service phased antenna arrays 124A, 124B, and 124C, a plurality of second beams of RF signals 142A, 142B, and 142C in a plurality of different directions different from the first direction towards a plurality of different downstream neighboring nodes, wherein each of the plurality of second beams of RF signals 142A, 142B, and 142C may be configured to carry at least one data frame of the plurality of data frames 140A, 140B, and 140C in a plurality of different data propagation paths in the wireless backhaul network based on the switch of the plurality of data frames 140A, 140B, and 140C and the detected label in the each data frame of the plurality of data frames 140A, 140B, and 140C.

In accordance with an embodiment, the central cloud server 102 may be configured to generate a global inter-node connections mappings (GINCM) information for a plurality of network nodes of the wireless backhaul network based on telemetry information received from the plurality of network nodes of the wireless backhaul network. The individual mesh nodes (repeater devices, access points, etc.) may collect and send telemetry information to the central cloud server 102 periodically or on demand. The telemetry information may include details about the node's currently active connections to neighbors, signal strengths, load levels, geographic locations, etc. The central cloud server 102 may aggregate and processes the telemetry data from across the whole mesh network. Based on analysis of the telemetry data, the central cloud server 102 may generate the Global Inter-Node Connections Mapping (GINCM) information that represents the current ideal interconnection topology for efficient routing across the entire wireless backhaul network. A portion of the GINCM information may then be disseminated back to the individual mesh nodes, such the repeater device 106B, to update their routing/forwarding decisions in the LANNNPM information. This is useful because while each node may have a localized view of neighboring node, the central cloud server 102 may construct a global inter-node connectivity map for the entire mesh using the aggregated telemetry data. Further, as network conditions change (new nodes added, wireless environment changes, loads shift etc.), the GINCM information may be periodically updated to provide an optimized routing configuration. Thus, pushing a portion of the centrally calculated GINCM information to all network nodes ensures a consistent routing configuration across the distributed wireless backhaul network. The data plane (nodes forwarding traffic) may be separated from the control plane logic in the central cloud server 102 for calculating the optimal mappings. This improves overall network performance, reliability and adaptability compared to fully distributed approaches.

In accordance with an embodiment, the central cloud server 102 may be further configured to cause the master WAP device 104A to insert the label to each data frame of the plurality of data frames 140A, 140B, and 140C based on the GINCM information for routing the plurality of data frames 140A, 140B, and 140C within the wireless backhaul network. The central cloud server 102 may send instructions to the master WAP device 104A to insert these specific labels (L1, L2, L3) into the plurality of data frames 140A, 140B, 140C as they ingress into the backhaul mesh network. The labeling may be done in accordance with the GINCM information, which maps the labels to the optimized routing paths for delivering the data frames to their intended destinations within the wireless backhaul network. Once labeled, the plurality of data frames 140A, 140B, 140C may be efficiently switched and routed across the wireless backhaul network using the label-based forwarding mechanisms in the repeater devices, such as the repeater device 106B. In this implementation, the centralized label instruction approach leverages the central cloud server's global network view and processing capabilities to optimize the routing of data frames through intelligent labeling, while keeping the distributed mesh nodes simple and responsive to the cloud's control instructions.

In accordance with an embodiment, each repeater device 106B of the plurality of repeater devices 106 may be further configured to store local active neighboring network nodes positions mapping (LANNNPM) information, and wherein the switch circuit 126 may be further configured to update the LANNNPM information when the upstream neighboring node or any one of plurality of different downstream neighboring nodes may be deactivated or a new upstream or downstream neighboring node may be activated for participation in the wireless backhaul network of the wireless communication system 100B. Each repeater device (e.g., the repeater device 106B) in the mesh network may store its own Local Active Neighboring Network Nodes Positions Mapping (LANNNPM) information. While the central cloud server 102 maintains an optimized global view, each repeater may still function autonomously using its local active neighbor mapping (i.e., the LANNNPM information), providing resilience and fast adaptability to localized topology changes in the dynamic mesh environment. Beneficially, a fast response may be ensured, where instead of waiting for a centralized controller to disseminate updates, each repeater may immediately respond to activated/deactivated neighbors by updating its mappings. If certain regions of the wireless backhaul network experience node failures, the repeaters in those regions may reroute traffic through updated active neighbor mappings while other regions operate normally. Furthermore, a reduced control overhead is ensured as only mapping changes relevant to a repeater's local neighborhood need to be tracked, reducing overhead compared to storing/updating a global mapping. The plurality of data frames 140A, 140B, and 140C may be segregated and routed to the corresponding service phased antenna array of the plurality of service phased antenna arrays 124A, 124B, and 124C further based on the LANNNPM information and the detected label. For example, knowing the destination may not be enough as the repeater device 106B may also need to know the specific active neighboring node to beam the frame towards in order to reach that destination. By intelligently using both the label information for destinations and the local active neighbor mapping in the LANNNPM information, the repeater devices may make accurate routing decisions while leveraging directional antennas to forward frames in an efficient and targeted manner across the wireless backhaul network.

In accordance with an embodiment, like the one or more service WAP devices 108, such as the service WAP device 108A, the master WAP device 104A may also serve its corresponding UEs, via WLAN signals, such as a WLAN signal 146 (Wi-Fi® signals).

Figure 1C:
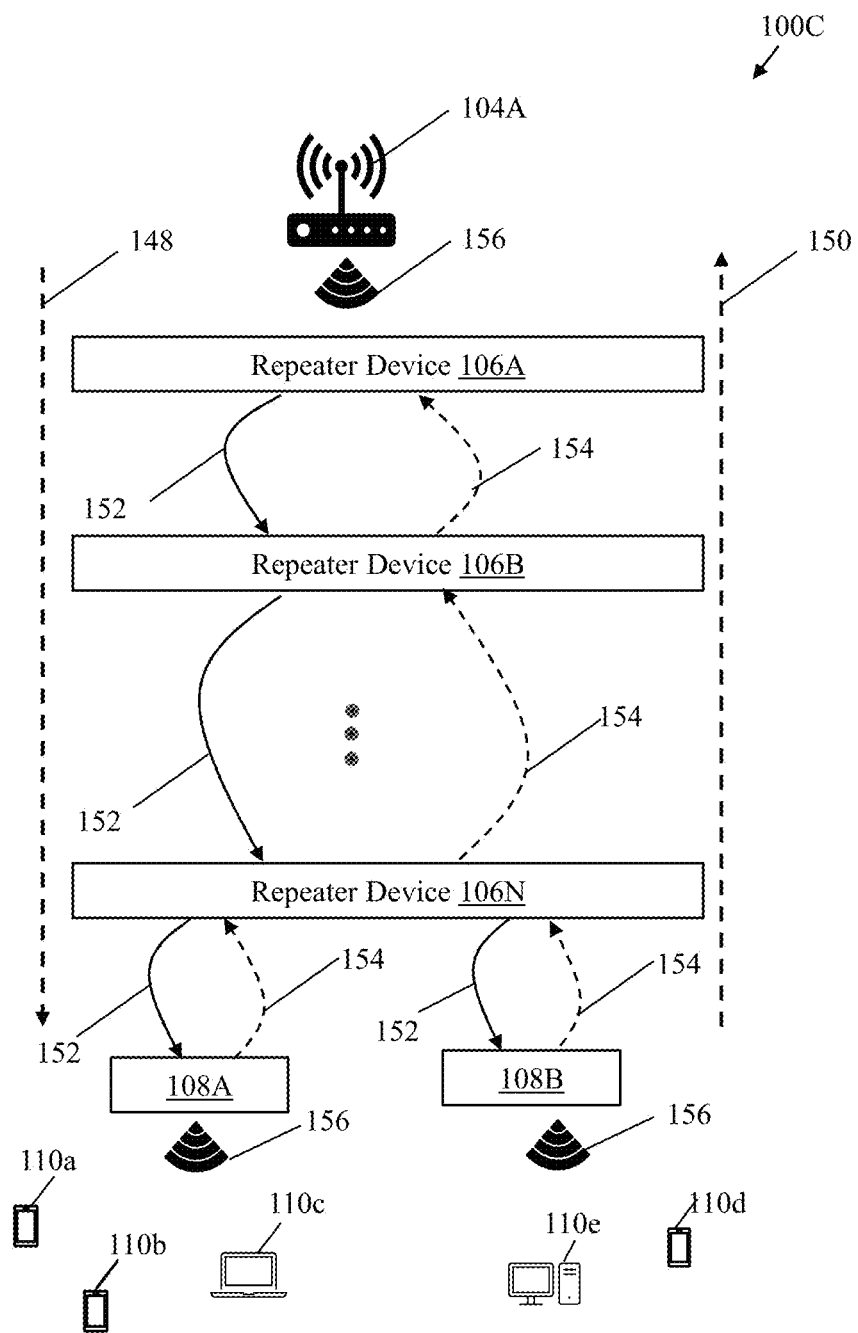
FIG. 1C is a diagram that illustrates an exemplary dual-path routing of user data across a plurality of hybrid analog-digital repeater devices in a wireless communication system, in accordance with an exemplary embodiment of the disclosure.

FIG. 1C is a diagram that illustrates an exemplary dual-path routing of user data across a plurality of repeater devices in a wireless communication system, in accordance with an exemplary embodiment of the disclosure. FIG. 1C is explained in conjunction with elements from FIGS. 1A and 1B. With reference to FIG. 1C, there is shown a network 100C of the plurality of repeater devices 106, such as the repeater devices 106A, 106B, and 106N. The plurality of repeater devices 106 may be repeater devices.

In accordance with an embodiment, each of the plurality of repeater devices 106 may be configured to execute a differential polarized routing of receive and transmit radio frequency (RF) signals in the intermediate frequency (e.g., millimeter wave frequency) in which a downstream communication 148 and an upstream communication 150 may be performed in a different polarization state (e.g., a vertical polarization and a horizontal polarization) in the network 100C of the plurality of repeater devices 106. The downstream communication 148 may refer one or more communication paths (e.g., one or more data propagation paths) from the one or more master WAP devices 104, such as the master WAP device 104A towards the one or more service WAP devices 108, such as the service WAP device 108A and the service WAP device 108B, via the network 100C of the plurality of repeater devices 106, such as the repeater devices 106A, 106B, and 106N. Further, in the downstream communication 148, the one or more service WAP devices 108 communicates corresponding user data to its corresponding UEs, such as the UEs 110a, 110b, and 110c (connected to the service WAP device 108A) and the UEs 110d and 110e (connected to the service WAP device 108B). In this embodiment, the network 100C of the plurality of repeater devices 106 may be a daisy-chain network. The upstream communication 150 may refer to a communication path from the UEs and the one or more service WAP devices 108 towards the one or more master WAP devices 104, such as the master WAP device 104A via the network 100C of the plurality of repeater devices 106.

In accordance with an embodiment, each of the plurality of repeater devices 106 may be configured to transmit a first beam of RF signals 152 carrying user data (e.g. the plurality of data frames 140A, 140B, and 140C of FIG. 1B with labels L1, L2 or L3) in an intermediate frequency band (e.g., mmWave frequency) in a first polarization state towards its neighboring repeater node, which then amplifies and relays the first beam of RF signals 152 in the intermediate frequency (e.g., mmWave frequency) in the first polarization state in the downstream communication 148. Similarly, for the upstream communication 150, each of the plurality of repeater devices 106 may be configured to transmit a second beam of RF signals 154 carrying user data in the intermediate frequency band in a second polarization state towards its neighboring repeater node, which then amplifies and relays further the second beam of RF signals 154 in the intermediate frequency band in the second polarization state in the upstream communication 150. The first polarization state may be different from the second polarization state. An example of the first and the second polarization state may be a vertical polarization state and a horizontal polarization state. In vertical polarization, the electric field component of the electromagnetic wave (i.e., the mmWave signal) oscillates vertically, meaning it moves up and down concerning the Earth's surface. In horizontal polarization, the electric field component of the electromagnetic wave (i.e., the mmWave signal) oscillates horizontally, moving side to side parallel to the Earth's surface.

In an implementation, the master WAP device 104A may be configured to communicate the first beam of RF signals 152 (e.g., in the intermediate frequency) or a wireless local area network (WLAN) signal 156 in a first WLAN frequency (e.g., higher frequency of the Wi-Fi® 6, 7 or 8) from the data source 112. In this implementation, the first beam of RF signals 152 may correspond to the first beam of RF signals 138 carrying the plurality of data frames 140A, 140B, and 140C of FIG. 1B. The first beam of RF signals 152 may be communicated in the intermediate frequency when the functions of the root node is integrated in the master WAP device 104A. Alternatively, the WLAN signal 156 may be communicated in the first WLAN frequency when the functions of root node may not be integrated in the master WAP device 104A. The one or more service WAP devices 108 may be configured to receive the first beam of RF signals 152 in the intermediate frequency band (e.g., mmWave frequencies or other intermediate frequencies in the range of 10-300 GHz) from the one or more second repeater devices (e.g., the repeater device 106N) and convert back to the WLAN signal 156 to serve one or more UEs 110 in a data throughput greater than a threshold throughput. The use of plurality of repeater devices 106 extends the coverage area of the one or more service WAP devices 108, allowing them to serve its corresponding UEs in areas that may have poor signal reception or are located farther away from the master WAP device 104A, without adding to latency due to the one or more analog data propagation paths with dual-polarized signals.

In accordance with an embodiment, the central cloud server 102 may be configured to route data traffic to and from the one or more service WAP devices 108 using two different pairs of dual-polarized signals. Each pair of dual-polarized signals may take a different path through the wireless network, passing through a single chain of the plurality of repeater devices 106 or different chains of repeater devices among the plurality of repeater devices 106. This provides rank-4 connectivity with completely different paths to the one or more service WAP devices 108 (e.g., the service WAP device 108A and the service WAP device 108B), thereby further enhancing resilience against blockages and interference. The rank-4 connectivity indicates multiple independent data streams that can be propagated via the hybrid repeater chains for improved wireless communication performance. For designated wireless links (e.g., certain critical links), the central cloud server 102 may be configured to coordinate between two synchronized service WAP devices, such as the service WAP devices 108A and 108B, to initiate separate streams over different RF chains. The independent streams may then be relayed through completely distinct hybrid repeater chains. This provides path redundancy to counter even simultaneous route disruptions.

In accordance with an embodiment, a donor side of each of the one or more service WAP devices 108 may be modified so that each of the one or more service WAP devices 108 may be configured to communicate with one or more repeater devices over intermediate frequency (e.g., mm Wave frequencies or other intermediate frequencies in the range of 10-300 GHz) using high-gain dual polarized antennas. In an implementation, a service side each of the one or more service WAP devices 108 may include a WLAN antenna and may not include a phase array antenna or any high-gain dual polarized antennas. Alternatively, in another implementation, the service side each of the one or more service WAP devices 108 may include a WLAN antenna and a phase array antenna. In such a case, the phase array antenna may be configured to communicate a beam of RF signals to its corresponding UEs or communicate the first WLAN signal at the same time depending on the position of its UE to be served. Alternatively, in another implementation, the service side each of the one or more service WAP devices 108 may include a phase array antenna without WLAN antenna. However, a WLAN adapter (e.g., 2.4 GHz or 5 Ghz WLAN adapter) may be provided in all implementations for low-frequency backchannel connectivity for the control channel.

Figure 1D:
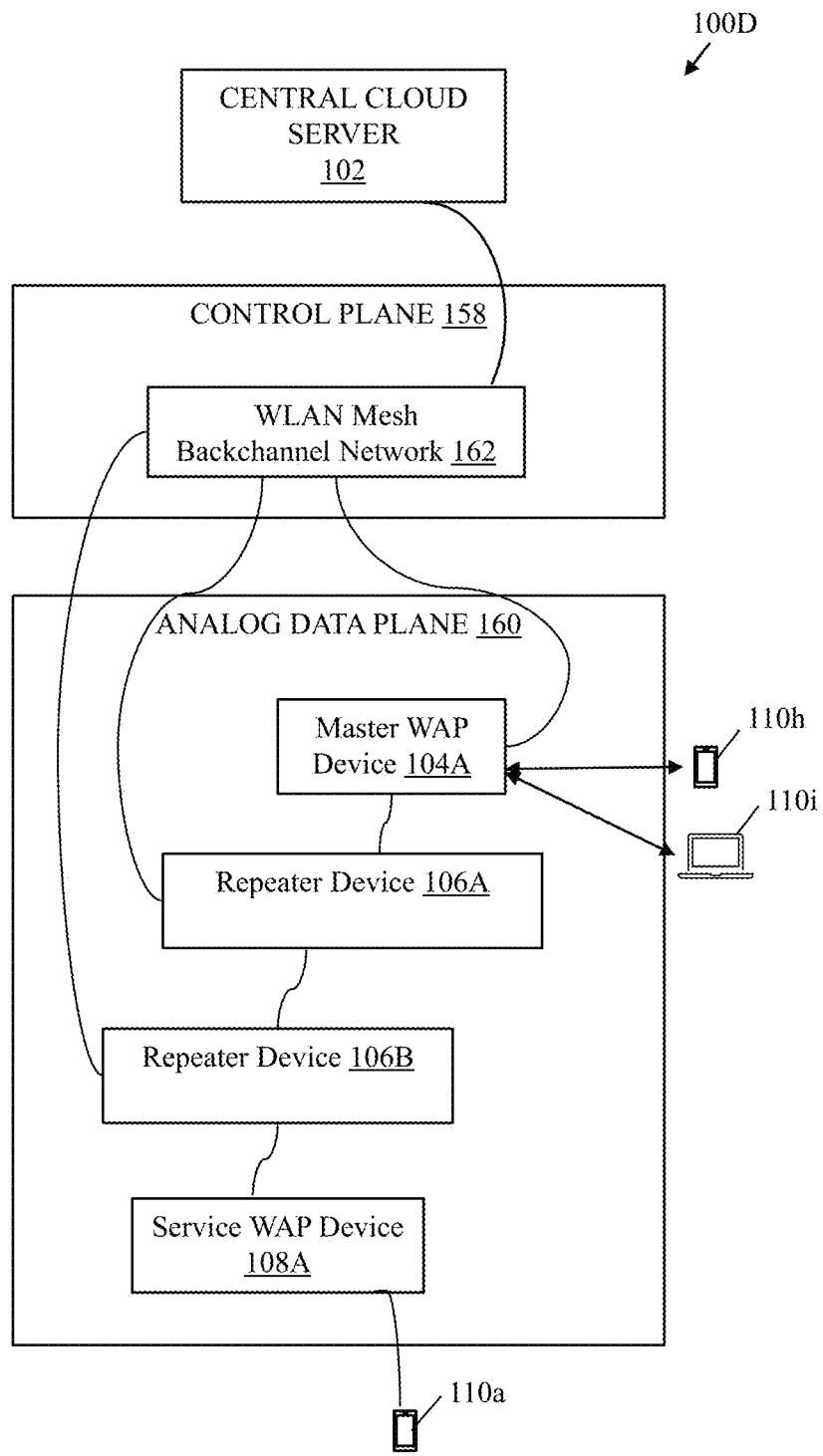
FIG. 1D is a diagram that illustrates an exemplary wireless communication system with a control plane and an analog data plane, in accordance with an exemplary embodiment of the disclosure.

FIG. 1D is a diagram that illustrates an exemplary wireless communication system with a control plane and an analog data plane, in accordance with an exemplary embodiment of the disclosure. FIG. 1D is explained in conjunction with elements from FIGS. 1A, 1B, and 1C. With reference to FIG. 1D, there is shown a wireless communication system 100D with a control plane 158 and an analog data plane 160.

In accordance with an embodiment, the wireless communication system 100D may employ a software-defined networking (SDN), where the control plane 158 may be separated from the analog data plane 160. In other words, the communication in management mesh for control and remote configuration of each network node is separate and independent from the data network, i.e., analog data plane 160. The data traffic (voice, video, etc.) flows in the data propagation path in analog form through the analog data plane 160, while the control plane 158 (signaling and management) uses a separate digital network, such as the WLAN mesh backchannel network 162 (e.g., may use 2.4 GHz or 5 GHz WLAN frequency). While data traverses the analog network, an out-of-band digital connectivity enables external coordination. The access points, such as the master WAP device 104A and the service WAP device 108A, may include a high bandwidth Wi-Fi® 7 or Wi-Fi® 8 compatible multi-user (MU) MIMO capability to provide wireless connectivity even in non-line-of sight paths. The one or more UEs, such as the UE 110h, the 110i, and the UE 110a may be Wi-Fi® 7 or Wi-Fi® 8 enabled and may connected to the wireless network using corresponding access points, such as the master WAP device 104A and the service WAP device 108A. Each of the master WAP device 104A and the service WAP device 108A may be equipped with multiple antennas to support Multi-User MIMO (MU-MIMO), which allows them to communicate with multiple devices concurrently.

In accordance with an embodiment, the plurality of repeater devices 106, such as the repeater devices 106A and 106B, may be configured to dynamically adjust their network topology based on instructions from the central cloud server 102. Further, based on the telemetry information, the central cloud server 102 may be configured to determine how each different types of network node, i.e., the master WAP device 104A, the plurality of repeater devices 106, and the one or more service WAP devices 108 may connect to each other, forming a mesh wireless backhaul network, daisy-chain wireless backhaul network, or even a custom hybrid of both. This provides an enhanced resilience, where even unforeseen failures in one part of the network may be bypassed by using alternative paths. The central cloud server 102 may be configured to generate configuration updates tailored to each node based on its capabilities and context and push these updates to individual nodes using the digital backchannel, e.g., the WLAN mesh backchannel network 162. Each network node may receive its specific configuration update and applies it within its local area. This enables flexibility and adaptability, as network nodes can adjust their behavior based on local conditions. The local conditions may refer to various factors specific to individual network nodes or their surrounding environment. These factors may influence how the network node operates and how the centralized controller, such as the central cloud server 102 configures each network node. The local conditions may include variations in received signal strength, signal-to-noise ratio, and interference levels within each network node's area, a level of activity on different frequency bands available to each network node, a number and type of devices connected to the network node, movement of users and variation in data usage (e.g., streaming, downloads) within the node's coverage area, different applications bandwidth and latency requirements (e.g., gaming, video conferencing may have varying bandwidth and latency demands), or environmental factors, such as physical obstacles, weather, temperature and humidity. Each of the one or more service WAP devices 108, such as the service WAP device 108A, may utilize a separate repeater chain to avoid relying on a single path, just like couriers taking different roads using the labeling scheme, described in FIG. 1B. This eliminates a single point of failure. Further, multi-source coordinated connectivity provides redundancy against impairments. In other words, by having multiple master WAP devices and service WAP devices send the same user data (data streams), even if one is affected, the others can still deliver the user data to its UE.

In accordance with an embodiment, there may be a test node or a reference node (e.g., UE 110f may be a CPE as a test node), such as a customer premise equipment (CPE) in the wireless communication system 100A or 100B. The test node may be used as an independent reference node to periodically or continuously ascertain network performce characteristics, such as a current SNR, SINR, RSSI, TSSI, a throughput rate when served by one of the network node (one of the service access point devices or the master wireless access point device 104A) in the wireless communication system 100A, 100B, or 100D. Such network performce characteristics may be reported to the central cloud server 102. The central cloud server 102 may use the information received independently by the test node for another layer of independent performance monitoring of the wireless backhaul network in the wireless communication system 100A, 100B, or 100D along with the telemetry information received from each network node. In case of detection of any performance drop, the central cloud server 102 may be further configured to detect where is the fault (i.e., identify one or more fault nodes) and accordingly re-configure one or more fault nodes to maintain or optimize the network performance (greater than defined threshold performance, for example, greater than 25 Giga byte per second throughput rate and the like) and accordingly update the global inter-node connections mappings (GINCM) information for a plurality of network nodes of the wireless backhaul network.

Figure 2:
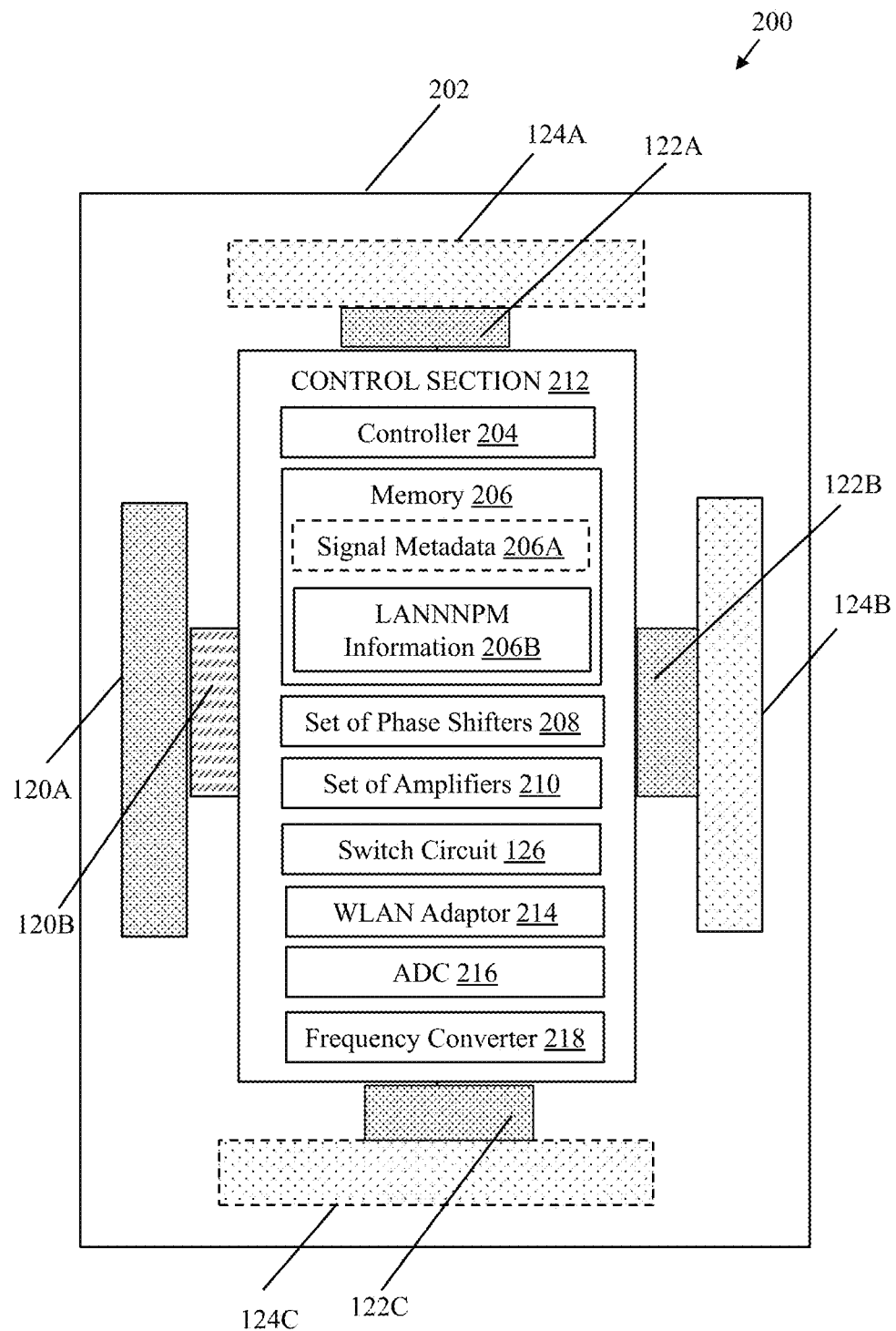
FIG. 2 is a block diagram that illustrates various components of an exemplary repeater device configured as a switch node in a wireless communication system, in accordance with an exemplary embodiment of the disclosure.

FIG. 2 is a block diagram that illustrates various components of an exemplary repeater device configured as a switch node in a wireless communication system, in accordance with an exemplary embodiment of the disclosure. FIG. 2 is explained in conjunction with elements from FIGS. 1A, 1B, 1C, and 1D. With reference to FIG. 2, there is shown a block diagram 200 of a repeater device 202. The repeater device 202 may correspond to the repeater device 106B (the switch node) of the plurality of repeater devices 106. The repeater device 202 may be a repeater device configured as the switch node.

The repeater device 202 may include a control section 212, which may include a controller 204, a memory 206, a set of phase shifters 208, a set of amplifiers 210, a switch circuit 126, a wireless local area network (WLAN) adapter 214, an analog-to-digital converter (ADC) 216, and a frequency converter 218. The repeater device 202 may further include a donor antenna 120A and one or more service phase antenna arrays 124A, 124B, and 124C. The donor antenna 120A may be connected to a donor port 120B. The donor port 120B may be connected to the donor antenna 120A at one end and the switch circuit 126 (e.g., the control section 212) at the other end. The repeater device 106B may further include the plurality of service ports 122A, 122B, and 122C. Each service port may be connected to one service phased antenna array of the plurality of service phased antenna arrays 124A, 124B, and 124C. The plurality of service phased antenna arrays 124A, 124B, and 124C of the repeater device 106B may be disposed at a plurality of different positions in the repeater device 106B.

The controller 204 may be a Field Programmable Gate Array (FPGA), which may be configured to manage digital functions like telemetry information processing, parameter extraction and control channel interface to the central cloud server 102. The controller 204 may be configured to receive an incoming RF signal relay from an upstream node and relay the incoming RF signal to one or more neighboring nodes. The controller 204 may be configured to extract the signal metadata 206A by digital signal processing of a portion (e.g., a header portion) of the first beam of RF signals without decoding the user data of the first beam of RF signal.

The memory 206 may include suitable logic, circuitry, and/or interfaces that may be configured to store instructions executable by the controller 204. The memory 206 may temporarily store and update the telemetry information, which may be periodically communicated to the central cloud server 102. Examples of implementation of the memory 206 may include, but not limited to, a random access memory (RAM), a dynamic random access memory (DRAM), a static random access memory (SRAM), a processor cache, a thyristor random access memory (T-RAM), a zero-capacitor random access memory (Z-RAM), a read only memory (ROM), a hard disk drive (HDD), a secure digital (SD) card, a flash drive, cache memory, and/or other non-volatile memory. The memory 206 may store the signal metadata 206A. In an implementation, the memory 206 may further store local active neighboring network nodes positions mapping (LANNNPM) information 206B. The controller 204 or the switch circuit 126 may be further configured to update the LANNNPM information 206B when the upstream neighboring node or any one of plurality of different downstream neighboring nodes may be deactivated or a new upstream or downstream neighboring node may be activated for participation in the wireless backhaul network of the wireless communication system 100A, 100B, 110C, or 110D.

The set of phase shifters 208 may be configured to perform precise phase control to digitally steer beams in directed orientations based on control instructions received from the central cloud server 102 or one of the network nodes under control of the central cloud server 102.

The set of amplifiers 210 may be configured to provide signal gain to overcome propagation losses and boost SNR to maintain link budgets over multiple hops of relaying, such as across the plurality of repeater devices 106, all the way to the one or more UEs 110. The set of amplifiers 210 may be high-gain amplifiers designed to operate in the intermediate frequency bands (e.g., mmWave frequencies in 24-300 GHz or other intermediate frequencies in the range of 10-300 GHz).

The switch circuit 126 may be connected to the set of amplifiers 210. The switch circuit 126 may be configured to perform dynamic beam steering by switching between different service phase antenna arrays, such as the one or more service phase antenna arrays 124A, 124B, and 124C to route RF signals along different directions as required based on detected labels (e.g., L1, L2, or L3). This enables adaptable signal propagation, responding to changing network conditions and optimizing communication paths for improved reliability and performance. This dynamic beam steering capability is particularly beneficial in scenarios where the environment or network conditions may vary, allowing the wireless communication system 100A or 100B to adapt and maintain efficient signal transmission.

The WLAN adapter 214 may be configured to handle lower WLAN frequencies (e.g., 2.4 GHz or 5 GHz in Wi-Fi®7 or 8) to establish a backchannel communication link, via the WLAN mesh backchannel network 162. This may be used for various purposes, including management and coordination between devices in the wireless backhaul network. The WLAN adapter 214 may be configured to provide a backchannel connectivity using the WLAN mesh backchannel network 162 and control of the network of the plurality of repeater devices 106 via a second WLAN frequency, based on the signal metadata 206A of the first beam of RF signal.

In an exemplary implementation, the ADC 216 may be configured to convert a header portion of a RF signal (in intermediate frequency or WLAN frequency) from analog to digital domain. While the data path remains entirely analog for lowest latency, each of the plurality of repeater devices 106, such as the repeater device 202 may extract the signal metadata 206A from RF signals for analysis. This allows deriving wireless metrics like timing parameters, signal quality, interference levels, channel state information, and reference signals using DSP techniques. Alternatively, in some implementations, the switch nodes, such as the repeater device 202, may not convert a header portion of the RF signal into digital domain and may use only the label inserted each of data frame for routing purposes, as described in FIG. 1B. In some cases, the ADC 216 may convert the label (a few bits) in digital domain or may not convert and use analog detection of labels. For example, frequency tones or frequency bins in the preamble of the analog signal may be assigned to represent different label values. The presence or absence of energy in those designated frequency bins would then encode the label value. At the receiver, such as the repeater device 202, an analog filter bank or Fourier analysis could detect the energies in the different frequency bins to decode the label value. In another example, at the master WAP device 104a, different analog waveform patterns or preamble sequences may be assigned to represent different label values, which may be modulated in the analog waveform with the specific preamble pattern corresponding to the desired label. At the receiver, such as the repeater device 202, analog matched filters or correlation may be used to detect the specific preamble pattern and decode the associated label value.

The frequency converter 218 may be configured to upconvert or down convert one radio frequency to another radio frequency of an RF signal. For example, the repeater device 202 may utilize the frequency converter 218 to convert a WLAN signal to a beam of RF signals in an intermediate frequency band (e.g., mmWave frequencies or other intermediate frequencies in the range of 10-300 GHz). The frequency converter 218 may perform frequency up conversion by frequency mixing of the WLAN signal with a local oscillator signal, generating an intermediate frequency (e.g., mmWave frequencies or other intermediate frequencies in the range of 10-300 GHz) for improved wireless communication performance. In some embodiments, the frequency converter 218 may include a phased locked loop (PLL) circuit, which acts as a local oscillator.

The donor antenna 120A may be communicatively coupled to a cascading receiver chain comprising various components (e.g., a set of low noise amplifiers (LNA), a set of receiver front end phase shifters, and a set of power combiners) for the signal reception (not shown for brevity). The donor antenna 120A may be configured to receive an incoming RF signal from an upstream node. The donor antenna 120A may be a WLAN antenna or a phase array antenna, such as a dual-polarized antenna.

The one or more service phase antenna arrays 124A, 124B, and 124C may be configured to relay a beam of RF signals to one or more downstream neighboring nodes. Each of the one or more service phase antenna arrays 124A, 124B, and 124C may be dual-polarized antennas, where separate antenna arrays may be used for horizontal and vertical polarizations allowing polarization diversity mechanisms. Each of the plurality of repeater devices 106 (such as the repeater device 202) may include multiple phased array antennas (e.g., the one or more service phase antenna arrays 124A, 124B, and 124C) with electrically steerable directive beams to focus signals along narrow beams. The phase antenna arrays may include individual phase shifters and amplifiers behind each radiating element to shape and control the beam pattern digitally.

Figure 3:
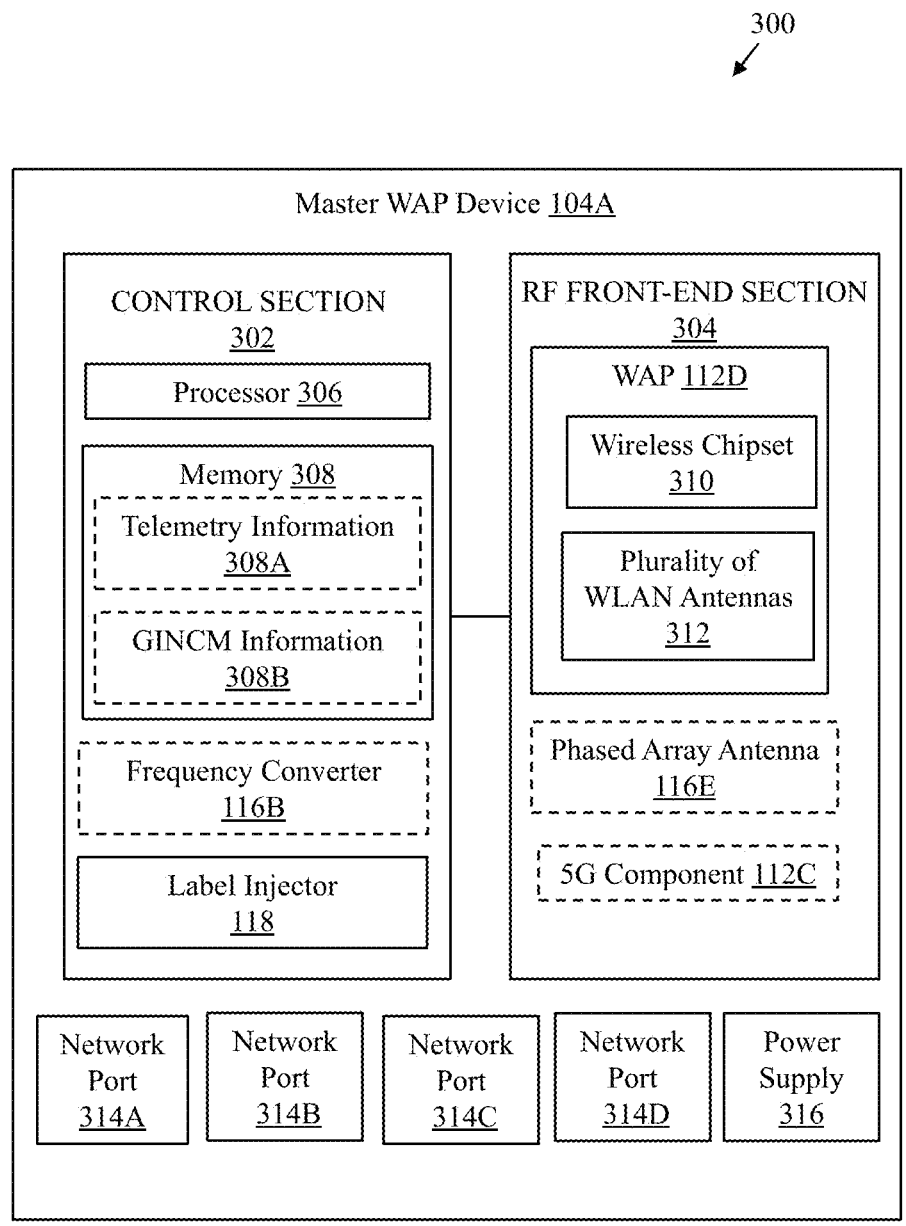
FIG. 3 is a block diagram that illustrates various components of an exemplary master wireless access point (WAP) device of a wireless communication system, in accordance with an exemplary embodiment of the disclosure.

FIG. 3 is a block diagram that illustrates various components of an exemplary master wireless access point (WAP) device of a wireless communication system, in accordance with an exemplary embodiment of the disclosure. FIG. 3 is explained in conjunction with elements from FIGS. 1A, 1B, 1C, 1D, and 2. With reference to FIG. 3, there is shown a block diagram 300 of the master WAP device 104A. The master WAP device 104A may correspond to the one or more master WAP devices 104 (FIG. 1A). The master WAP device 104A may include a control section 302 and a front-end RF section 304. The control section 302 may include a processor 306 and a memory 308, which may include the telemetry information 308A and the global inter-node connections mappings (GINCM) information 308B. In an implementation, the control section 302 may include a frequency converter 116B. In some implementations, the frequency converter 116B may not be provided. The front-end RF section 304 may include a wireless chipset 310 and a plurality of WLAN antennas 312. In some implementations, the master WAP device 104A may be modified to further include a high-gain dual polarized antenna, such the phased array antenna 116E. The master WAP device 104A may include a plurality of network ports, such as network ports 314A to 314D, and a power supply 316. The processor 306 may be communicatively coupled to the memory 308, the frequency converter 116B (when provided), and the different components of the front-end RF section 304 and the master WAP device 104A.

The processor 306 may be configured to communicate a wireless local area network (WLAN) signal in a first WLAN frequency from the data source 112. The processor 306 may be responsible for overall processing tasks, routing data and managing network operations and receiving instructions from the central cloud server 102. The processor 306 may be a multi-core processor to handle the increased demands of Wi-Fi® 7 or 8, beamforming, and Mu-MIMO.

The memory 308 may include the telemetry information 308A and the GINCM information 308B. The telemetry information 308A may comprise a unique identifier (ID) of the master WAP device 104A, its geo-location, an operational state of the master WAP device 104A, and the signal metadata of WLAN signals or mm Wave signals communicated by the master WAP device 104A. The memory 308 may further store temporary data, such as the plurality of data frames 140A, 140B, and 140C, and processing buffers to maintain smooth network performance. Examples of the implementation of the memory 308 may be similar to that of the memory 206 of FIG. 2.

The frequency converter 116B may be present when a functionality of the root node (one of the repeater device) is implemented in the master WAP device 104A. When present, the frequency converter 116B may be used to up convert or down convert frequencies.

The wireless access point 112D may include the wireless chipset 310, which may be a hardware component responsible for transmitting and receiving WLAN (Wi-Fi®) signals, supporting multiple frequency bands (e.g., 2.4 GHz, 5 GHZ, and 6 GHz bands or 6-9 GHz bands), and processing radio signals, such as modulation, demodulation, filtering, and amplification to ensure seamless communication with the one or more Wi-Fi® enabled UEs 110. The wireless chipset 310 may include radio elements that may convert digital data into radio waves for transmission and vice versa.

The wireless access point 112D may further include the plurality of WLAN antennas 312, which may be configured to transmit and receive WLAN (Wi-Fi®) signals. The plurality of WLAN antennas 312 may be in MIMO configuration for performing MU-MIMO and beamforming to enhance coverage and signal strength, for the one or more UEs 110. The number of antennas in the MIMO configuration may vary depending on use case (e.g., consumer grade or enterprise grade), for example 2×2, 4×4 or 8×8 MIMO configurations may be provided.

In some implementations, alternatively, the master WAP device 104A may be modified to include one or more high-gain antennas, such as a phased array antenna in the 5G component 112C to capture a 5G or 6G mmWave cellular signal from a radio access network (RAN) node (e.g., the gNodeB 114C or a 5G or 6G small cell) and/or to relay a mmWave signal to one or more repeater devices of the plurality of repeater devices 106.

The network port 314A may be an optical fiber port (such as the optical fiber port 112B of FIG. 1B). The network port 314B may be an Ethernet port (such as the Ethernet port 112A of FIG. 1B). The network port 314C may be a WLAN Fast Ethernet (FE) port (such as the WLAN FE port 116A of FIG. 1B). The network port 314D may be an USB port. The power supply 316 may be configured to provide power to the various components of the master WAP device 104A.

The master WAP device 104A may further include the label injector 118, which may be configured to insert a label to each data frame of a plurality of data frames received from the data source 112 (e.g., via the network ports 314A to 314D).

Figure 4:
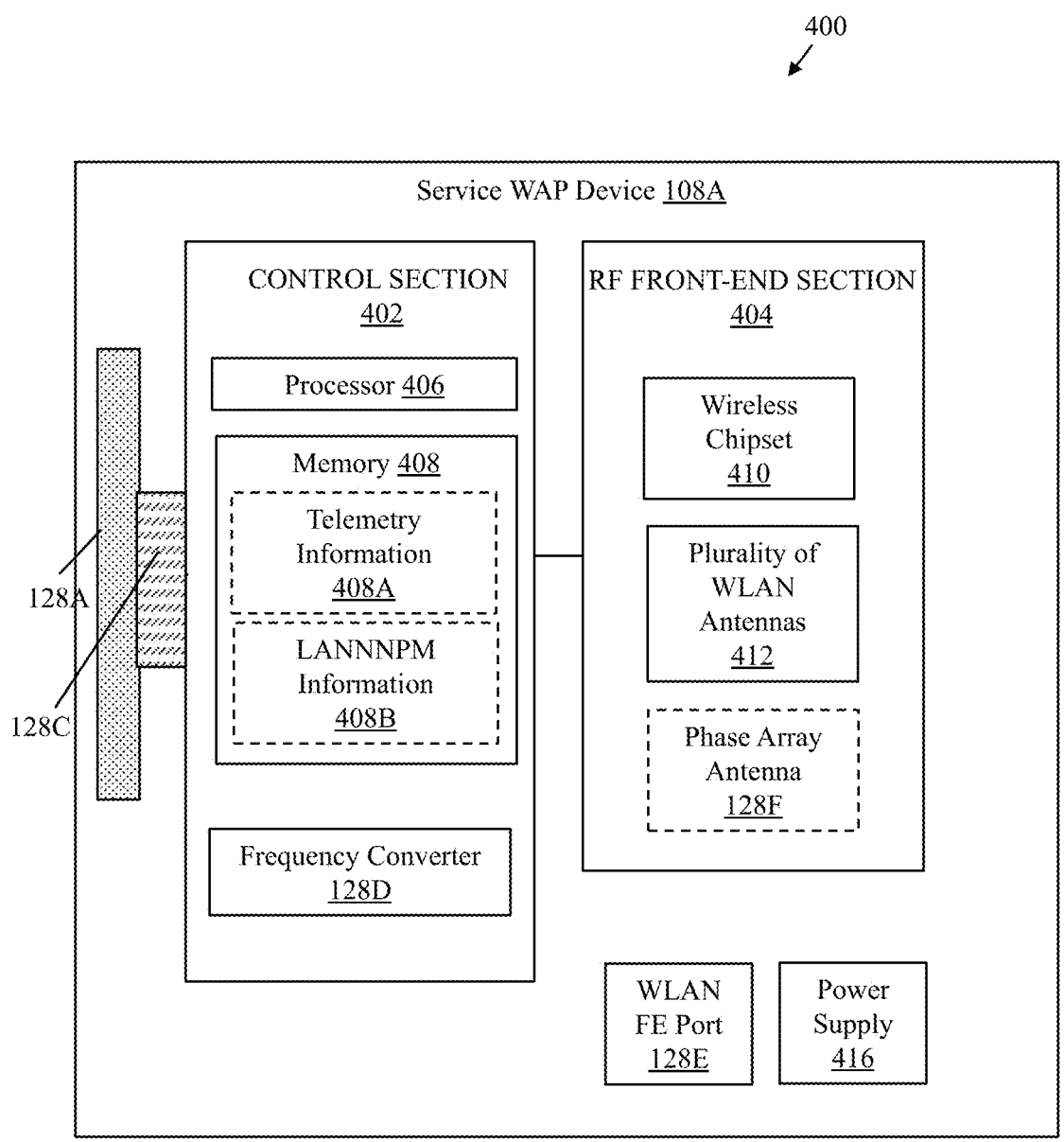
FIG. 4 is a block diagram that illustrates various components of an exemplary service WAP device configured as an access node in a wireless communication system, in accordance with an exemplary embodiment of the disclosure.

FIG. 4 is a block diagram that illustrates various components of an exemplary service WAP device configured as an access node in a wireless communication system, in accordance with an exemplary embodiment of the disclosure. FIG. 4 is explained in conjunction with elements from FIGS. 1A, 1B, 1C, 1D, 2, and 3. With reference to FIG. 4, there is shown a block diagram 400 of the service WAP device 108A configured as an access node. The service WAP device 108A may correspond to the one or more service WAP devices 108 (FIG. 1A). The service WAP device 108A may include a control section 402 and a front-end RF section 404. The control section 402 may include a processor 406 and a memory 408 (with telemetry information 408A and LANNNPM information 408B), and a frequency converter 128D. The front-end RF section 404 may include a wireless chipset 410, a plurality of WLAN antennas 412. In some implementations, the service WAP device 108A may be modified to further include a high-gain dual polarized antenna, such the phased array antenna 128A at a donor side connected to the donor port 128C. In an implementation, the service side may have the plurality of WLAN antennas 412. In another implementation, the service side may include another high-gain antenna, such as a phased array antenna 128F along with the plurality of WLAN antennas 412. In some implementations, the network ports for wired communication may not be provided as it primarily interfaces with wireless WLAN devices. However, in some cases, the network ports like the master WAP device 104A may be provided. The processor 406 may be communicatively coupled to the memory 408, the frequency converter 128D and the different components of the front-end RF section 404. The service WAP device 108A may further include a power supply 416 to provide power to the various components of the service WAP device 108A.

The processor 406 may be configured to receive a first beam of RF signals in the intermediate frequency band (e.g., mmWave frequencies or other intermediate frequencies in the range of 10-300 GHz) from the one or more second repeater devices (e.g., one or more of the repeater devices 106B to 106N) and convert back to the WLAN signal to serve one or more UEs 110 in a data throughput greater than a threshold throughput (e.g., 30-100 Gbps).

The memory 408 may include the telemetry information 408A and the LANNNPM information 408B. The telemetry information 408A may comprise a unique identifier (ID) of the service WAP device 108A, its geo-location, an operational state of the service WAP device 108A, and the signal metadata of WLAN signals or mm Wave signals received/transmitted by the service WAP device 108A. Examples of the implementation of the memory 408 may be similar to that of the memory 206 of FIG. 2.

The frequency converter 128D may be used to convert the second beam of RF signals in the intermediate frequency band to the first WLAN frequency (e.g., within 6-9 GHz). In some cases, the intermediate frequency may be converted to another intermediate frequency for wide beam relay. Examples of implementation of the wireless chipset 410, the plurality of WLAN antennas 412, the phased array antennas 128A and 128F may be similar to that of the master WAP device 104A of FIG. 3. In some implementations, the antenna patch 128B may be provided (not shown), which may be an antenna chipset, an analog front-end circuitry, or antenna module configured to support both vertical and horizontal beams via the phased array antenna 128A, which may be a high-gain antenna.

The WLAN FE port 128E may be connected to one or both of the plurality of WLAN antennas 412 or the phased array antenna 128F. Each of the one or more service WAP devices 108, such as the service WAP device 108A and the service WAP devices 108B, may be configured as an access node, which acts as a remote WLAN antenna (e.g., a remote Wi-Fi® Antenna) for the master WAP device 104A, extending the Wi-Fi coverage area.

Figure 5:
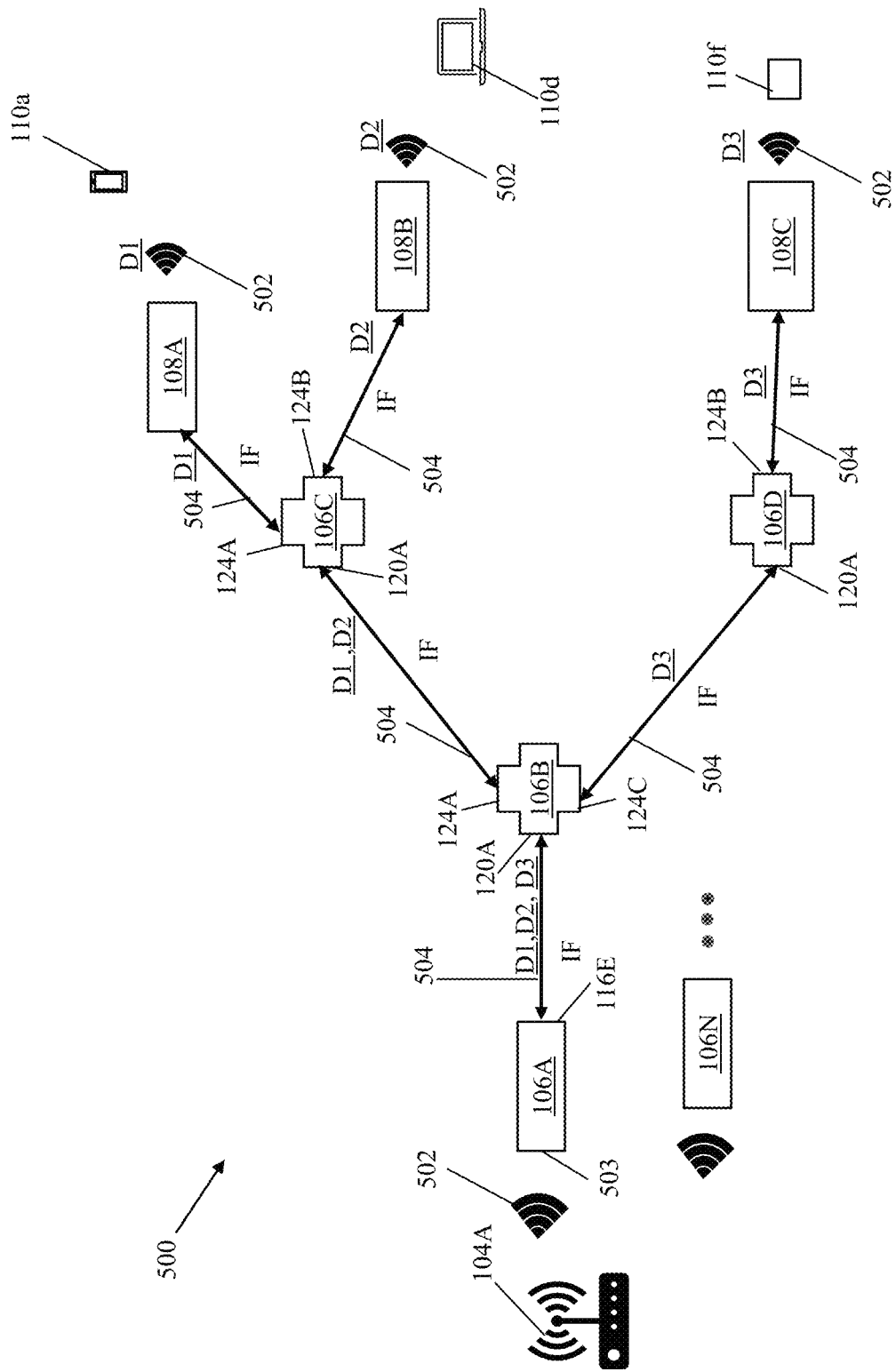
FIG. 5 is a diagram that illustrates an exemplary implementation of a wireless communication system with repeater devices configured as a root node and a switch node, in accordance with an exemplary embodiment of the disclosure.

FIG. 5 is a diagram that illustrates an exemplary implementation of a wireless communication system with repeater devices configured as a root node and a switch node, in accordance with an exemplary embodiment of the disclosure. FIG. 5 is explained in conjunction with elements from FIGS. 1A, 1B, 1C, 1D, 2, 3, and 4. With reference to FIG. 5, there is shown an exemplary wireless communication system 500 that includes the master WAP device 104A, a wireless backhaul mesh network of the repeater devices 106A, 106B, 106D, and 106N, and the service WAP devices 108A, 108B, and 108C. In this implementation, the root node (e.g., the repeater device 106A) may be implemented as a distinct device from the master WAP device 104A. In such an implementation, the master WAP device 104A may communicate a WLAN signal 502 to the root node, which may then convert the WLAN signal 502 to intermediate frequency.

In operation, the master WAP device 104A may be configured to communicate a WLAN signal 502 in a first WLAN frequency from the data source 112. In an implementation, the first WLAN frequency may be in a range of 6-9 GHZ (e.g., Wi-Fi® 6, 7, 8). The master WAP device 104A may be at a first location. The plurality of repeater devices 106 may be disposed at a plurality of different locations. The repeater device 106A configured as a root node may be configured to receive the WLAN signal 502 from the master WAP device 104A via a donor antenna 503 (which may be a WLAN antenna or a phase array antenna connected to a WLAN Fast Ethernet (FE) port). In an implementation, the master WAP device 104A may include the label injector 118 to insert a label to each data frame of a plurality of data frames received from the data source 112. The label comprises routing information for the plurality of data frames for routing the plurality of data frames within the wireless backhaul network. Alternatively, the root node (i.e., the repeater device 106A) may be the ingress node of labels and may include the label injector 118 to insert a label to each data frame of a plurality of data frames (referred to as plurality of labeled data frames D1, D2, and D3 after labeling) received from the WLAN signal 502 (i.e., the source AP). The repeater device 106A may utilize a frequency converter (e.g., the frequency converter 116B) to convert the WLAN signal 502 to a beam of RF signals 504 in an intermediate frequency band (e.g., mmWave frequencies or other intermediate frequencies in the range of 10-300 GHz). The frequency converter may perform frequency up conversion by frequency mixing of the WLAN signal 502 with a local oscillator signal, generating an intermediate frequency for improved wireless communication performance. The beam of RF signals 504 in the intermediate frequency band may be a mm Wave frequency in a range of 10-300 GHz or other intermediate frequency in a range of 10-300 GHz. The intermediate frequency band of the first beam of RF signals 504 may be a licensed mmWave spectrum of a network operator or an unlicensed mmWave spectrum. The repeater device 106A may be a root node that may then relay the beam of RF signals 504 in the intermediate frequency band carrying the plurality of labeled data frames D1, D2, and D3 to one or more second repeater devices (e.g., the repeater devices 106B and 106D configured as switch nodes) of the plurality of repeater devices 106. In this case, the beam of RF signals 504 carrying the plurality of labeled data frames D1, D2, and D3 may be relayed to the repeater device 106B. The repeater device 106B may be configured as a switch node that may receive the incoming beam of mmWave signal (i.e., the beam of RF signals 504) via the donor antenna 120A from a first direction from the upstream node (i.e., the repeater device 106A). In the switch node configuration, the donor antenna 120A may be implemented as a phase array antenna configured to receive a narrow beam, i.e., the beam of RF signals 504 via the donor antenna 120A, detect the plurality of labeled data frames D1, D2, and D3, and concurrently route the beam of RF signals 504 two or more downstream nodes in two or more different directions based on each detected label of the plurality of labeled data frames D1, D2, and D3. In this case, the switch circuit 126 (of FIG. 2) may be configured to switch the beam of RF signals 504 to the two service phase antenna arrays 124A and 124C of the repeater device 106B to concurrently route two parallel beams of RF signals 504 to two downstream nodes (e.g., the repeater devices 106C and 106D) in two different directions. The two service phase antenna arrays 124A and 124C may be arranged at different positions and orientations with respect to each other and with respect to the donor antenna 120A. In other words, one or more of the plurality of repeater devices 106 may be configured to concurrently route an incoming beam of RF signal in the intermediate frequency (e.g., mmWave signal) received from an upstream node in a first direction to two or more downstream nodes in two or more different directions. Each of the plurality of repeater devices 106 may be equipped with the set of amplifiers 210 (e.g., power amplifiers) and the set of phase shifters 208, which enhances the mm Wave signal and relays across the repeater devices 106A, 106B, 106C, and 106D over longer distances. The beams of RF signal 504 routed to the repeater devices 106C from the repeater device 106B may carry the labeled data frames D1 and D2. The beams of RF signal 504 routed to the repeater devices 106D from the repeater device 106B may carry the labelled data frames D3.

The repeater device 106C may be configured to segregate and route the labeled data frames D1 and D2 to two different service WAP devices, such as the service WAP device 108A and the service WAP device 108B. The service WAP devices 108A may be configured to receive, via the phased array antenna 128A, the first beam of RF signals 504 carrying the labeled data frame D1 in the intermediate frequency band from the service phase antenna array 124A of the repeater device 106C and convert the first beam of RF signals 504 back to the WLAN signal 502 in the first WLAN frequency (e.g., Wi-Fi® 6, 7, or 8., i.e., within 6-9 GHz frequency range) using the frequency converter 128D. The frequency converter 128D may be used to down convert the first beam of RF signals 504 in the intermediate frequency band to the first WLAN frequency to serve to its connected UE 110a that consumes the data frame D1 in a data throughput greater than a threshold throughput, for example, in multi-gigabit data rate. Similarly, the service WAP devices 108B may be configured to receive the first beam of RF signals 504 in the intermediate frequency band carrying the labeled data frame D2 from the service phase antenna array 124B of the repeater devices 106C and convert the first beam of RF signals 504 back to the WLAN signal 502 in the first WLAN frequency (e.g., Wi-Fi® 6, 7, or 8., i.e., within 6-9 GHz frequency range) to serve to its connected UE 110d consuming the labeled data frame D2. The service WAP devices 108C may be configured to receive the first beam of RF signals 504 in the intermediate frequency band carrying the labeled data frame D3 from the service phase antenna array 124B of the repeater devices 106D and convert the first beam of RF signals 504 back to the WLAN signal 502 in the first WLAN frequency (e.g., Wi-Fi® 6, 7, or 8., i.e., within 6-9 GHz frequency range) to serve to its connected UE 110f (e.g., a client device, smart TV, or a CPE) with the labeled data frame D3. In an implementation, each of the service WAP devices may function as an egress node, which may remove the label before serving the destination node, i.e., the UEs in this case.

In accordance with an embodiment, the repeater devices 106A to 106D extends the coverage area of the master WAP device 104A and the one or more service WAP devices 108, with a negligible latency even though user data passes through multiple hops. The repeater devices 106A to 106D may be disposed as a radio frequency (RF) bridge between the master WAP device 104A and the service WAP devices 108A, 108B, and 108C such that a data propagation path of user data relayed through a network of the repeater devices 106A to 106D may be analog without any digital decoding or encoding of the user data or other header information (e.g., MAC headers) in the first beam of RF signals 504 to reduce latency less than a threshold time, in the order of nanoseconds. Further, a backchannel connectivity and control of the network of the repeater devices 106A to 106D may be via a second WLAN frequency (e.g., 2.4 GHz or 5 GHz) frequency. The second WLAN frequency may be less than the first WLAN frequency. In the upstream communication 150, the service WAP devices 108A, 108B, and 108C may be configured to acquire RF signals from its corresponding UEs and pack the user data back to the master WAP device 104A via the repeater devices 106A to 106D. In such a case, each of the service WAP devices 108A, 108B, and 108C may function as ingress node, which may include the label injector 118 for upstream communication towards the root node and the master WAP device 104A.

In an exemplary implementation, data streams/RF signals received by the service WAP devices 108A, 108B, and 108C from one or more UEs during the upstream communication 150 to the master WAP device 104A may have very different relative signals levels. Aggregating these received signals next to each other in the frequency domain may degrade the signal quality of weaker signals, due to leakage of out-of-band emissions of comparatively stronger signals. To address this issue, some relative gain equalization may be applied at the service WAP devices 108A, 108B, and 108C before aggregating the RF signals from the UEs and sending them up upstream towards the master WAP device 104A via one or more repeater devices. In some embodiments, the relative gain values may be coordinated, or shared with, or may be set by the central cloud server 102. This enables MIMO pre-coding or decoding to take into account such gain adjustment in their MIMO processing.

Figure 6:
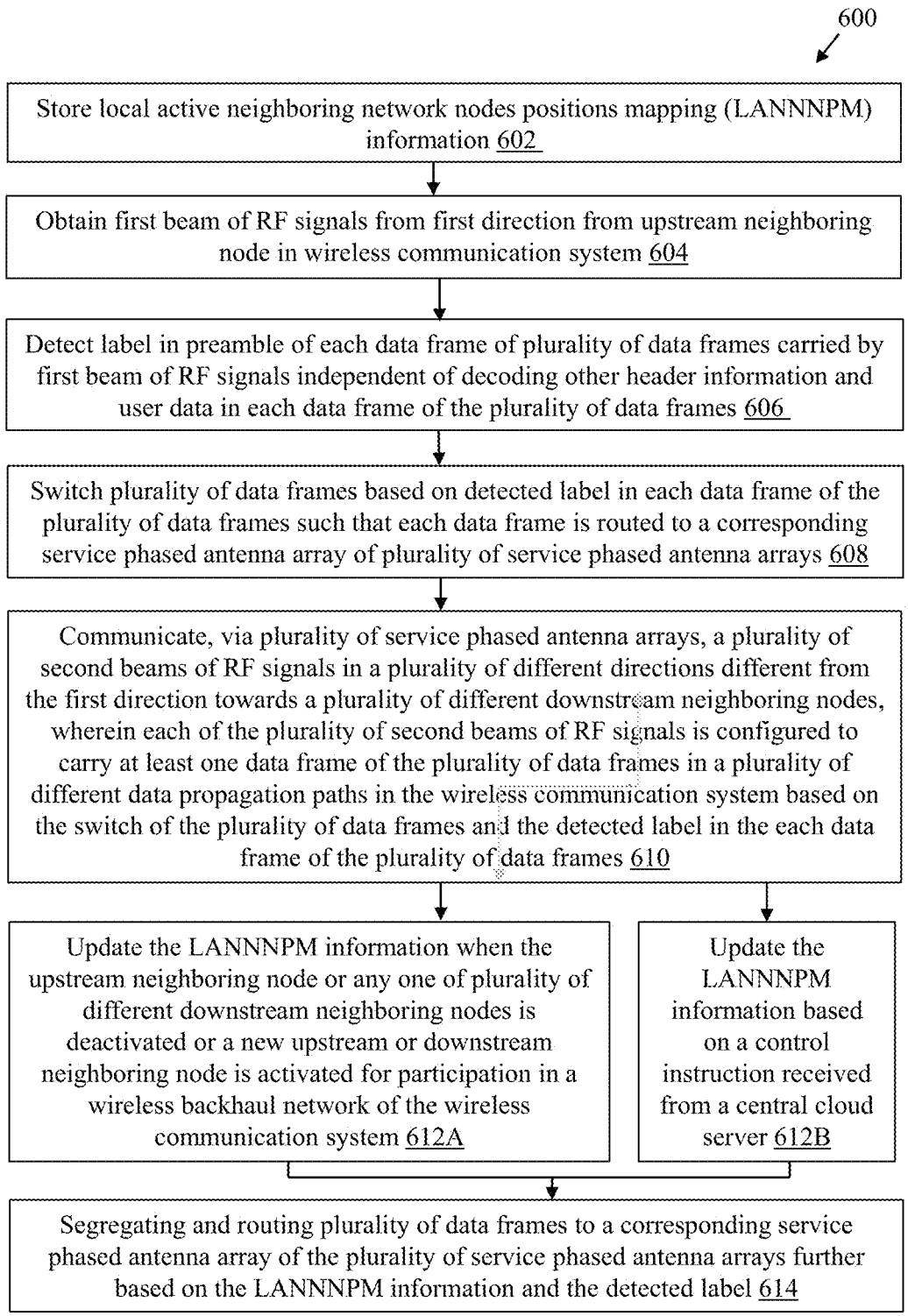
FIG. 6 is a flowchart of a wireless communication method for high-performance, ultra-low latency routing of data frames in a wireless backhaul network, in accordance with an embodiment of the disclosure.

FIG. 6 is a flowchart of a wireless communication method for high-performance, ultra-low latency routing of data frames in a wireless backhaul network, in accordance with an embodiment of the disclosure. FIG. 6 is explained in conjunction with elements from FIGS. 1A, 1B, 1C, 1D 2, 3, 4, and 5. With reference to FIG. 6, there is shown a flowchart of a method 600 comprising exemplary operations 602 through 614. The method 600 may be implemented in the repeater device 106B configured as the switch node in the wireless communication system 100A, 100B, 100D and 500.

At 602, local active neighboring network nodes positions mapping (LANNNPM) information may be stored in the repeater device 106B.

At 604, the first beam of RF signals 138 may be obtained from the first direction from an upstream neighboring node in the wireless communication system 100B or 500. The donor antenna 120A configured to obtain the first beam of RF signals 138. The upstream neighboring node may be one of the root node, the master WAP device 104A, or another switch node. The switch circuit 126 may be further configured to receive the first beam of RF signals 138 via the donor port 120B.

At 606, a label (e.g., labels L1, L2, and L3) may be detected in a preamble of each data frame of a plurality of data frames 140A, 140B, and 140C carried by the first beam of RF signals 138 independent of decoding other header information and user data in each data frame of the plurality of data frames 140A, 140B, and 140C. The switch circuit 126 may be configured to detect the label (e.g., labels L1, L2, and L3) in the preamble of each data frame of a plurality of data frames 140A, 140B, and 140C carried by the first beam of RF signals 138.

At 608, the plurality of data frames 140A, 140B, and 140C may be switched based on the detected label in each data frame of the plurality of data frames 140A, 140B, and 140C such that each data frame may be routed to a corresponding service phased antenna array of the plurality of service phased antenna arrays 124A, 124B, and 124C. The switch circuit 126 may be further configured to switch the plurality of data frames 140A, 140B, and 140C based on the detected label in each data frame of the plurality of data frames 140A, 140B, and 140C.

At 610, the plurality of second beams of RF signals 142A, 142B, and 142C may be communicated via the plurality of service phased antenna arrays 124A, 124B, and 124C in a plurality of different directions different from the first direction towards a plurality of different downstream neighboring nodes, where each of the plurality of second beams of RF signals 142A, 142B, and 142C may be configured to carry at least one data frame of the plurality of data frames 140A, 140B, and 140C in a plurality of different data propagation paths in the wireless communication system 100B based on the switch of the plurality of data frames 140A, 140B, and 140C and the detected label in the each data frame of the plurality of data frames 140A, 140B, and 140C. The switch circuit 126 may be further configured to communicate, via the plurality of service phased antenna arrays 124A, 124B, and 124C, the plurality of second beams of RF signals 142A, 142B, and 142C in the plurality of different directions. The control passes to 612A or 612B.

At 612A, the LANNNPM information 206B may be updated when the upstream neighboring node or any one of plurality of different downstream neighboring nodes may be deactivated or a new upstream or downstream neighboring node may be activated for participation in a wireless backhaul network of the wireless communication system 100A, 100B, 100D, or 500. The switch circuit 126 or the controller 204 may be further configured to update the LANNNPM information 206B.

At 612B, the LANNNPM information 206B may be updated based on a control instruction received from the central cloud server 102. The switch circuit 126 or the controller 204 may be further configured to update the LANNNPM information 206B based on the control instruction received from the central cloud server 102.

At 614, the plurality of data frames 140A, 140B, and 140C may be segregated and routed to a corresponding service phased antenna array of the plurality of service phased antenna arrays 124A, 124B, and 124C further based on the LANNNPM information 208B and the detected label. The switch circuit 126 may be further configured to segregate and route plurality of data frames 140A, 140B, and 140C.

Figure 7A:
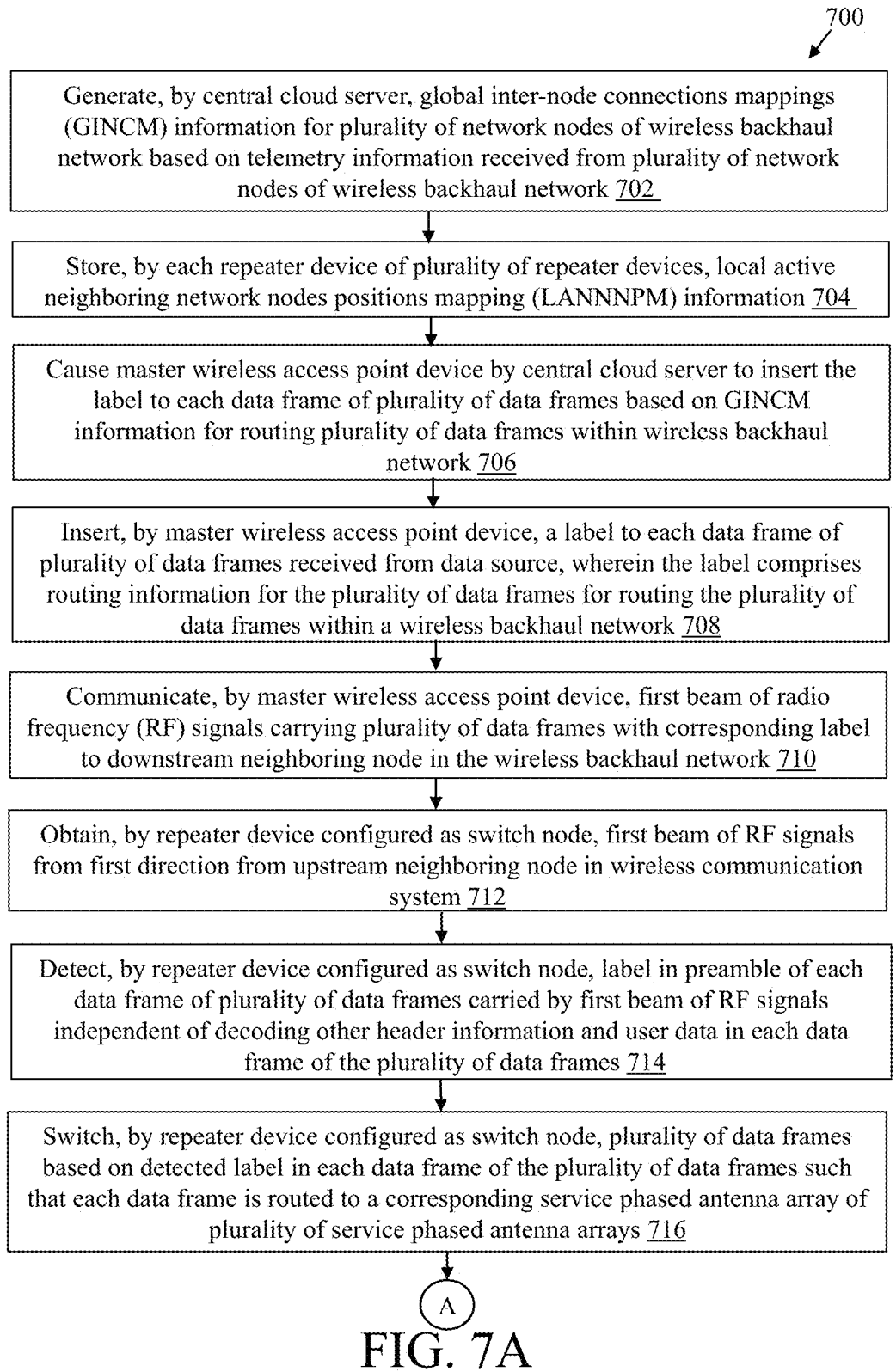
FIGS. 7A and 7B collectively, a flowchart of a wireless communication method for high-performance, ultra-low latency routing of data frames in a wireless backhaul network, in accordance with another embodiment of the disclosure.
Figure 7B:
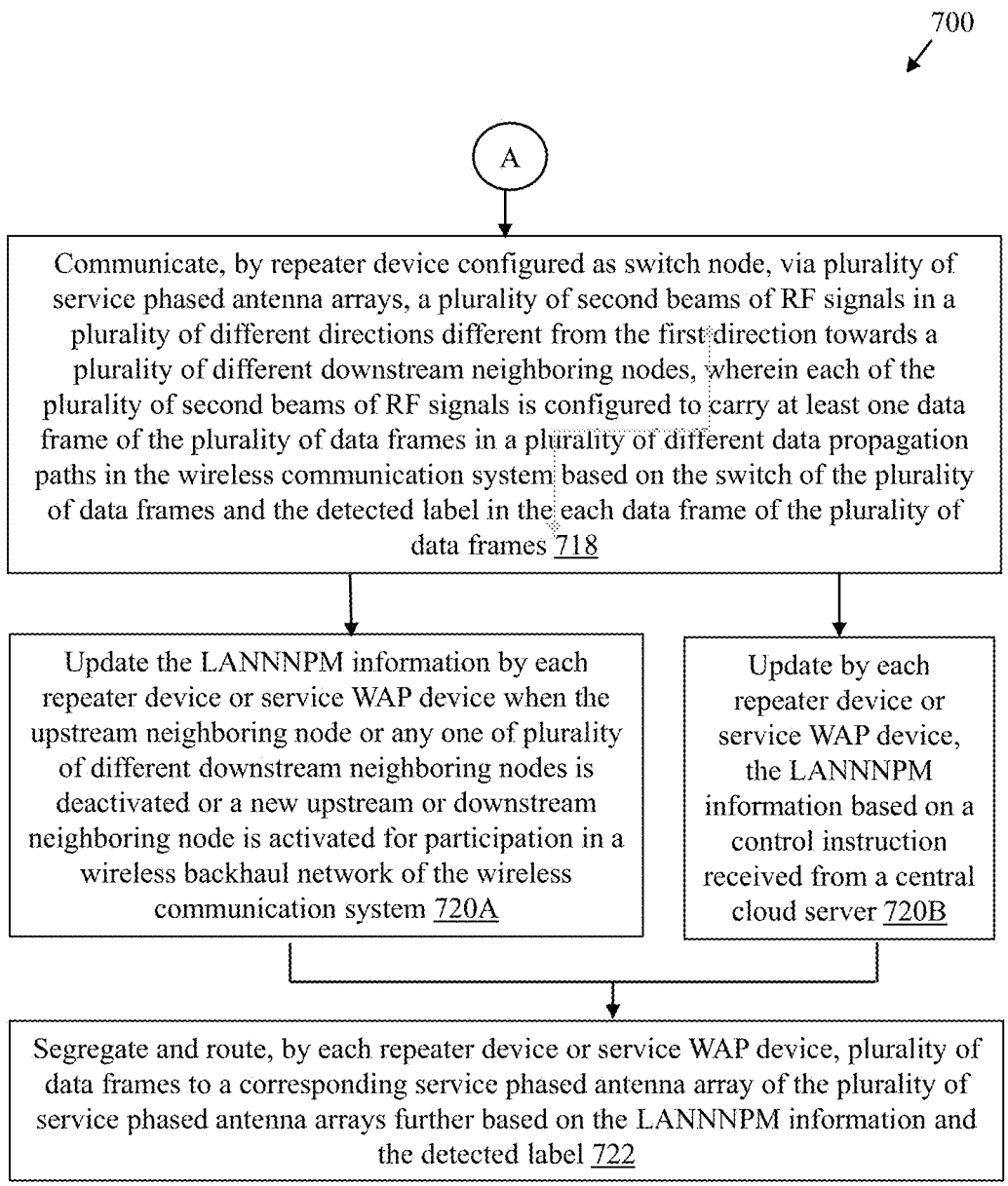

FIGS. 7A and 7B collectively, a flowchart of a wireless communication method for high-performance, ultra-low latency routing of data frames in a wireless backhaul network, in accordance with another embodiment of the disclosure. FIGS. 7A and 7B are explained in conjunction with elements from FIGS. 1A, 1B, 1C, 2, 3, 4, and 5. With reference to FIGS. 7A and 7B, there is shown a flowchart of a method 700 comprising exemplary operations 702 through 722. The method 700 may be implemented in the wireless communication system 100A, 100B, 100D and 500.

At 702, the global inter-node connections mappings (GINCM) information 308B may be generated by the central cloud server 102 for a plurality of network nodes of the wireless backhaul network based on telemetry information received from the plurality of network nodes of the wireless backhaul network.

At 704, the local active neighboring network nodes positions mapping (LANNNPM) information 206B or 408B may be stored by each repeater device 106B of the plurality of repeater devices 106.

At 706, the master WAP device 104A may be caused by the central cloud server 102 to insert the label to each data frame of the plurality of data frames 140A, 140B, and 140C based on the GINCM information for routing the plurality of data frames 140A, 140B, and 140C within the wireless backhaul network.

At 708, a label may be inserted, by the master WAP device 104A, to each data frame of the plurality of data frames 140A, 140B, and 140C received from the data source 112, wherein the label comprises routing information for the plurality of data frames 140A, 140B, and 140C for routing the plurality of data frames 140A, 140B, and 140C within the wireless backhaul network.

At 710, the first beam of radio frequency (RF) signals 138 carrying plurality of data frames with corresponding label may be communicated, by master wireless access point device 104A, to a downstream neighboring node in the wireless backhaul network.

At 712, the first beam of RF signals 138 may be obtained, by the repeater device 106B configured as switch node, from the first direction from the upstream neighboring node in the wireless backhaul network. The upstream neighboring node may be one of the master WAP device 104A, the root node, or another switch node.

At 714, a label may be detected, by the repeater device 106B configured as the switch node, in a preamble of each data frame of the plurality of data frames 140A, 140B, and 140C carried by the first beam of RF signals 138 independent of decoding other header information and user data in each data frame of the plurality of data frames 140A, 140B, and 140C.

At 716, the plurality of data frames 140A, 140B, and 140C may be switched, by the repeater device 106B configured as the switch node, based on the detected label in the each data frame of the plurality of data frames 140A, 140B, and 140C such that each data frame may be routed to a corresponding service phased antenna array of the plurality of service phased antenna arrays 124A, 124B, and 124C.

At 718, the plurality of second beams of RF signals 142A, 142B, and 142C may be communicated, by the repeater device 106B configured as the switch node, via the plurality of service phased antenna arrays 124A, 124B, and 124C in a plurality of different directions different from the first direction towards a plurality of different downstream neighboring nodes. Each of the plurality of second beams of RF signals 142A, 142B, and 142C may be configured to carry at least one data frame of the plurality of data frames 140A, 140B, and 140C in a plurality of different data propagation paths in the wireless backhaul network based on the switch of the plurality of data frames 140A, 140B, and 140C and the detected label in the each data frame of the plurality of data frames 140A, 140B, and 140C. The control may pass to 720A or 720B.

At 720A, the LANNNPM information 206B may be updated by each repeater device or service WAP device when the upstream neighboring node or any one of plurality of different downstream neighboring nodes may be deactivated or a new upstream or downstream neighboring node may be activated for participation in a wireless backhaul network of the wireless communication system 100A, 100B, 100D, or 500. The switch circuit 126 or the controller 204 may be further configured to update the LANNNPM information 206B.

At 720B, the LANNNPM information 206B may be updated by each repeater device or service WAP device based on a control instruction received from the central cloud server 102.

At 722, the plurality of data frames 140A, 140B, and 140C may be segregated and routed, by each repeater device or service WAP device, to a corresponding service phased antenna array of the plurality of service phased antenna arrays 124A, 124B, and 124C further based on the LANNNPM information 208B and the detected label.

Various embodiments of the disclosure may provide the repeater device 106B configured as a switch node in the wireless communication system 100A, 100B, 100D, or 500 (FIG. 1B and FIG. 5). The repeater device 106B may include the donor antenna 120A configured to obtain a first beam of RF signals 138 from a first direction from an upstream neighboring node in the wireless communication system 100B. The repeater device 106B may further include the plurality of service phased antenna arrays 124A, 124B, and 124C may be disposed at a plurality of different positions in the repeater device 106B. The repeater device 106B may further include the switch circuit 126 configured to detect a label (e.g., labels L1, L2, and L3) in a preamble of each data frame of a plurality of data frames 140A, 140B, and 140C carried by the first beam of RF signals 138 independent of decoding other header information and user data in each data frame of the plurality of data frames 140A, 140B, and 140C. The switch circuit 126 may be further configured to switch the plurality of data frames 140A, 140B, and 140C based on the detected label in the each data frame of the plurality of data frames 140A, 140B, and 140C such that each data frame may be routed to a corresponding service phased antenna array of the plurality of service phased antenna arrays 124A, 124B, and 124C. The switch circuit 126 may be further configured to communicate, via the plurality of service phased antenna arrays 124A, 124B, and 124C, a plurality of second beams of RF signals 142A, 142B, and 142C in a plurality of different directions different from the first direction towards a plurality of different downstream neighboring nodes, wherein each of the plurality of second beams of RF signals 142A, 142B, and 142C may be configured to carry at least one data frame of the plurality of data frames 140A, 140B, and 140C in a plurality of different data propagation paths in the wireless communication system 100B based on the switch of the plurality of data frames 140A, 140B, and 140C and the detected label in the each data frame of the plurality of data frames 140A, 140B, and 140C.

Various embodiments of the disclosure may provide the wireless communication system 100A, 100B, 100D, or 500 (FIGS. 1A, 1B, 1C, 1D, and 500). The wireless communication system 100A, 100B, 100D, or 500 may include the master wireless access point device 104A configured to insert a label to each data frame of a plurality of data frames 140A, 140B, and 140C received from the data source 112, wherein the label comprises routing information for the plurality of data frames 140A, 140B, and 140C for routing the plurality of data frames 140A, 140B, and 140C within a wireless backhaul network. The plurality of repeater devices 106 may be disposed at a plurality of different locations. At least one repeater device 106B of the plurality of repeater devices 106 may include the donor antenna 120A configured to obtain a first beam of RF signals 138 from a first direction from an upstream neighboring node in the wireless communication system 100B. The repeater device 106B may further include the plurality of service phased antenna arrays 124A, 124B, and 124C may be disposed at a plurality of different positions in the repeater device 106B. The repeater device 106B may further include the switch circuit 126 configured to detect a label (e.g., labels L1, L2, and L3) in a preamble of each data frame of a plurality of data frames 140A, 140B, and 140C carried by the first beam of RF signals 138 independent of decoding other header information and user data in each data frame of the plurality of data frames 140A, 140B, and 140C. The switch circuit 126 may be further configured to switch the plurality of data frames 140A, 140B, and 140C based on the detected label in each data frame of the plurality of data frames 140A, 140B, and 140C such that each data frame may be routed to a corresponding service phased antenna array of the plurality of service phased antenna arrays 124A, 124B, and 124C. The switch circuit 126 may be further configured to communicate, via the plurality of service phased antenna arrays 124A, 124B, and 124C, a plurality of second beams of RF signals 142A, 142B, and 142C in a plurality of different directions different from the first direction towards a plurality of different downstream neighboring nodes, wherein each of the plurality of second beams of RF signals 142A, 142B, and 142C may be configured to carry at least one data frame of the plurality of data frames 140A, 140B, and 140C in a plurality of different data propagation paths in the wireless communication system 100B based on the switch of the plurality of data frames 140A, 140B, and 140C and the detected label in the each data frame of the plurality of data frames 140A, 140B, and 140C.

Various embodiments of the disclosure may provide a non-transitory computer-readable medium having stored thereon, computer implemented instructions that when executed by a computer causes a communication system to execute operations, the operations comprising obtaining a first beam of RF signals 138 from a first direction from an upstream neighboring node in the wireless backhaul network. The operations further comprise detecting a label in a preamble of each data frame of a plurality of data frames 140A, 140B, and 140C carried by the first beam of RF signals 138 independent of decoding other header information and user data in each data frame of the plurality of data frames 140A, 140B, and 140C. The operations further comprise switching the plurality of data frames 140A, 140B, and 140C based on the detected label in each data frame of the plurality of data frames 140A, 140B, and 140C such that each data frame may be routed to a corresponding service phased antenna array of a plurality of service phased antenna arrays 124A, 124B, and 124C of the repeater device 106B; and communicating a plurality of second beams of RF signals 142A, 142B, and 142C in a plurality of different directions different from the first direction towards a plurality of different downstream neighboring nodes, wherein each of the plurality of second beams of RF signals 142A, 142B, and 142C may be configured to carry at least one data frame of the plurality of data frames 140A, 140B, and 140C in a plurality of different data propagation paths in the wireless backhaul network based on the switching of the plurality of data frames 140A, 140B, and 140C and the detected label in the each data frame of the plurality of data frames 140A, 140B, and 140C.

While various embodiments described in the present disclosure have been described above, it should be understood that they have been presented by way of example, and not limitation. It is to be understood that various changes in form and detail can be made therein without departing from the spirit and scope of the present disclosure. In addition to using hardware (e.g., within or coupled to a central processing unit ("CPU"), microprocessor, micro controller, digital signal processor, processor core, system on chip ("SOC") or any other device), implementations may also be embodied in software (e.g. computer readable code, program code, and/or instructions disposed in any form, such as source, object or machine language) disposed for example in computer-readable storage medium such as a non-transitory computer-readable medium configured to store the software. Such software can enable, for example, the function, fabrication, modeling, simulation, description and/or testing of the apparatus and methods described herein. For example, this can be accomplished using general program languages (e.g., C, C++), hardware description languages (HDL) including Verilog HDL, VHDL, and so on, or other available programs. Such software can be disposed of in any known computer-readable storage medium such as non-transitory computer-readable medium, such as semiconductor, magnetic disc, or optical disc (e.g., CD-ROM, DVD-ROM, etc.). The software can also be disposed as computer data embodied in a computer-readable storage medium such as non-transitory computer-readable transmission medium (e.g., solid state memory any other non-transitory medium including digital, optical, analog-based medium, such as removable storage media). Embodiments of the present disclosure may include methods of providing the apparatus described herein by providing software describing the apparatus and subsequently transmitting the software as a computer data signal over a communication network including the Internet and intranets.

It is to be further understood that the system described herein may be included in a semiconductor intellectual property core, such as a microprocessor core (e.g., embodied in HDL) and transformed to hardware in the production of integrated circuits. Additionally, the system described herein may be embodied as a combination of hardware and software. Thus, the present disclosure should not be limited by any of the above-described exemplary embodiments but should be defined only in accordance with the following claims and their equivalents.

Various aspects of the present disclosure are described by narrative text, flowcharts, diagrams of computer systems and/or diagrams of the machine logic included in various computer program product (CPP) embodiments. With respect to any flowcharts, depending upon the technology involved, the operations can be performed in a different order than what is shown in a given flowchart. For example, again depending upon the technology involved, two operations shown in successive flowchart blocks may be performed in reverse order, as a single integrated operation, concurrently, or in a manner at least partially overlapping in time.

A computer program product embodiment ("CPP embodiment" or "CPP") is a term used in the present disclosure to describe any set of one, or more, storage media (also called "mediums") collectively included in a set of one, or more, storage devices that collectively include machine readable code corresponding to instructions and/or data for performing computer operations specified in a given CPP claim. A "storage device" is any tangible device that can retain and store instructions for use by a computer processor. Without limitation, the computer-readable storage medium may be an electronic storage medium, a magnetic storage medium, an optical storage medium, an electromagnetic storage medium, a semiconductor storage medium, a mechanical storage medium, or any suitable combination of the foregoing. Some known types of storage devices that include these mediums include: diskette, hard disk, random access memory (RAM), read-only memory (ROM), erasable programmable read-only memory (EPROM or Flash memory), static random access memory (SRAM), compact disc read-only memory (CD-ROM), digital versatile disk (DVD), memory stick, floppy disk, mechanically encoded device (such as punch cards or pits/lands formed in a major surface of a disc) or any suitable combination of the foregoing. A computer-readable storage medium, as that term is used in the present disclosure, is not to be construed as storage in the form of transitory signals per se, such as radio waves or other freely propagating electromagnetic waves, electromagnetic waves propagating through a waveguide, light pulses passing through a fiber optic cable, electrical signals communicated through a wire, and/or other transmission media. As will be understood by those of skill in the art, data is typically moved at some occasional points in time during normal operations of a storage device, such as during access, de-fragmentation, or garbage collection, but this does not render the storage device as transitory because the data is not transitory while it is stored.

What is claimed is:

1. A repeater device configured as a first switch node in a wireless communication system, the repeater device comprising:
   a donor antenna configured to obtain a first beam of radio frequency (RF) signals from a first direction from an upstream neighboring node in the wireless communication system;
   a plurality of service phased antenna arrays at a plurality of different positions in the repeater device; and
   a switch circuit configured to:
      detect a label in a preamble of each data frame of a plurality of data frames carried by the first beam of RF signals independent of decoding header information and user data in the each data frame of the plurality of data frames,
         wherein the header information is different from the label;
      determine routing decisions for the plurality of data frames based on the detected label in the each data frame of the plurality of data frames;
      switch, via a RF switching fabric, the plurality of data frames based on the detected label in the each data frame of the plurality of data frames such that the each data frame is routed to a corresponding service phased antenna array of the plurality of service phased antenna arrays; and
      communicate, via the plurality of service phased antenna arrays, a plurality of second beams of RF signals in a plurality of different directions towards a plurality of different downstream neighboring nodes based on the switch of the plurality of data frames and the detected label in the each data frame of the plurality of data frames.

2. The repeater device according to claim 1, further comprising a donor port connected to the donor antenna and the switch circuit, wherein the switch circuit is further configured to receive the first beam of RF signals via the donor port.

3. The repeater device according to claim 1, further comprising a plurality of service ports, wherein
   each service port of the plurality of service ports is connected to one service phased antenna array of the plurality of service phased antenna arrays, and
   the switch circuit is further configured to route the plurality of data frames to a corresponding service port of the plurality of service ports based on the detected label in the each data frame of the plurality of data frames.

4. The repeater device according to claim 1, wherein
   the plurality of different directions is different from the first direction,
   each of the plurality of second beams of RF signals is configured to carry at least one data frame of the plurality of data frames in a plurality of different data propagation paths in the wireless communication system based on the switch of the plurality of data frames and the detected label in the each data frame of the plurality of data frames, and
   the upstream neighboring node is one of: a root node, a master wireless access point device, or a new switch node of the wireless communication system.

5. The repeater device according to claim 1, wherein each of the plurality of different downstream neighboring nodes is one of: a service wireless access point device or a second switch node of the wireless communication system.

6. The repeater device according to claim 1, further comprising a memory configured to store local active neighboring network nodes positions mapping (LANNNPM) information,
   wherein the switch circuit is further configured to update the LANNNPM information when the upstream neighboring node or any one of the plurality of different downstream neighboring nodes is deactivated or a new upstream or downstream neighboring node is activated for participation in a wireless backhaul network of the wireless communication system.

7. The repeater device according to claim 6, wherein the switch circuit is further configured to update the LANNNPM information based on a control instruction received from a central cloud server.

8. The repeater device according to claim 6, wherein the plurality of data frames are segregated and routed to the corresponding service phased antenna array of the plurality of service phased antenna arrays further based on the LANNNPM information and the detected label.

9. The repeater device according to claim 1, wherein the label comprises routing information that indicates at least one of a destination node identifier or a quality-of-service priority level for the each data frame of the plurality of data frames.

10. The repeater device according to claim 9, wherein the label further indicates at least one of an antenna beam selection indicator associated with the plurality of service phased antenna arrays or a polarization selection indicator for the each data frame of the plurality of data frames.

11. The repeater device according to claim 1, wherein the switch circuit is further configured to:
   generate control signals corresponding to the determined routing decisions; and
   transmit the generated control signals to the RF switching fabric.

12. A wireless communication system, comprising:
   a master wireless access point device configured to insert a label to each data frame of a plurality of data frames received from a data source,
      wherein the label comprises routing information for the plurality of data frames for routing the plurality of data frames within a wireless backhaul network; and
   a plurality of repeater devices disposed at a plurality of different locations,
      wherein at least one repeater device of the plurality of repeater devices comprises:
      a donor antenna configured to obtain a first beam of radio frequency (RF) signals from a first direction from an upstream neighboring node in the wireless backhaul network;
      a plurality of service phased antenna arrays disposed at a plurality of different positions in the at least one repeater device; and
      a switch circuit configured to:
         detect the label in a preamble of the each data frame of the plurality of data frames carried by the first beam of RF signals independent of decoding header information and user data in the each data frame of the plurality of data frames,
            wherein the header information is different from the label;
         determine routing decisions for the plurality of data frames based on the detected label in the each data frame of the plurality of data frames;
         switch, via a RF switching fabric, the plurality of data frames based on the detected label in the each data frame of the plurality of data frames such that the each data frame is routed to a corresponding service phased antenna array of the plurality of service phased antenna arrays; and communicate, via the plurality of service phased antenna arrays, a plurality of second beams of RF signals in a plurality of different directions towards a plurality of different downstream neighboring nodes based on the switch of the plurality of data frames and the detected label in the each data frame of the plurality of data frames.

13. The wireless communication system according to claim 12, wherein the upstream neighboring node is one of: the master wireless access point device, a root node, or a switch node of the wireless communication system.

14. The wireless communication system according to claim 12, wherein each the plurality of different downstream neighboring nodes is one of: a service wireless access point device or a switch node of the wireless communication system.

15. The wireless communication system according to claim 12, further comprising a central cloud server configured to generate global inter-node connections mappings (GINCM) information for a plurality of network nodes of the wireless backhaul network based on telemetry information received from the plurality of network nodes of the wireless backhaul network.

16. The wireless communication system according to claim 15, wherein the central cloud server is further configured to cause the master wireless access point device to insert the label to the each data frame of the plurality of data frames based on the GINCM information for routing the plurality of data frames within the wireless backhaul network.

17. The wireless communication system according to claim 12, wherein the at least one repeater device of the plurality of repeater devices is configured to store local active neighboring network nodes positions mapping (LANNNPM) information, and the switch circuit is further configured to update the LANNNPM information when the upstream neighboring node or any one of the plurality of different downstream neighboring nodes is deactivated or a new upstream or downstream neighboring node is activated for participation in the wireless backhaul network of the wireless communication system.

18. The wireless communication system according to claim 12, wherein the routing information that indicates at least one of a destination node identifier or a quality-of-service priority level for the each data frame of the plurality of data frames, an antenna beam selection indicator associated with the plurality of service phased antenna arrays, or a polarization selection indicator for the each data frame of the plurality of data frames.

19. A method for routing data frames in a wireless backhaul network, the method comprising:

in a repeater device:

obtaining a first beam of radio frequency (RF) signals from a first direction from an upstream neighboring node in the wireless backhaul network;

detecting a label in a preamble of each data frame of a plurality of data frames carried by the first beam of RF signals independent of decoding other-header information and user data in the each data frame of the plurality of data frames, wherein the header information is different from the label;

determining routing decisions for the plurality of data frames based on the detected label in the each data frame of the plurality of data frames;

switching, via a RF switching fabric, the plurality of data frames based on the detected label in the each data frame of the plurality of data frames such that the each data frame is routed to a corresponding service phased antenna array of a plurality of service phased antenna arrays of the repeater device; and communicating a plurality of second beams of RF signals in a plurality of different directions towards a plurality of different downstream neighboring nodes based on the switching of the plurality of data frames and the detected label in the each data frame of the plurality of data frames.

20. A non-transitory computer readable medium having stored thereon computer executable code, which when executed by a processor, cause the processor to execute operations, the operations:

obtaining a first beam of radio frequency (RF) signals from a first direction from an upstream neighboring node in a wireless backhaul network;

detecting a label in a preamble of each data frame of a plurality of data frames carried by the first beam of RF signals independent of decoding header information and user data in the each data frame of the plurality of data frames, wherein the header information is different from the label;

determining routing decisions for the plurality of data frames based on the detected label in the each data frame of the plurality of data frames;

switching, via a RF switching fabric, the plurality of data frames based on the detected label in the each data frame of the plurality of data frames such that the each data frame is routed to a corresponding service phased antenna array of a plurality of service phased antenna arrays of a repeater device; and communicating a plurality of second beams of RF signals in a plurality of different directions towards a plurality of different downstream neighboring nodes based on the switching of the plurality of data frames and the detected label in the each data frame of the plurality of data frames.

* * * * *